US012693625B2

(12) United States Patent
Hayato

(10) Patent No.: US 12,693,625 B2
(45) Date of Patent: Jul. 28, 2026

(54) IMAGE FORMING APPARATUS

(71) Applicant: CANON KABUSHIKI KAISHA, Tokyo (JP)

(72) Inventor: Takuya Hayato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/941,028

(22) Filed: Nov. 8, 2024

(65) Prior Publication Data

US 2025/0172905 A1 May 29, 2025

(30) Foreign Application Priority Data

Nov. 26, 2023 (JP) ................................ 2023-199523

(51) Int. Cl.
*G03G 15/00* (2006.01)
*G03G 21/18* (2006.01)

(52) U.S. Cl.
CPC ................................ *G03G 21/1892* (2013.01)

(58) Field of Classification Search
CPC ........... G03G 15/0863; G03G 15/5079; G03G 15/55; G03G 21/1892; G03G 2221/18; G03G 2221/1823
USPC .................................................... 399/12, 111
See application file for complete search history.

(56) References Cited

U.S. PATENT DOCUMENTS

| | | | | |
|---|---|---|---|---|
| 8,724,135 B2 | 5/2014 | Misumi | | |
| 10,855,880 B2 * | 12/2020 | Sasaki | ................ | H04N 1/00538 |
| 2018/0046137 A1 * | 2/2018 | Ajima | ................ | G03G 15/0863 |

FOREIGN PATENT DOCUMENTS

| | | | |
|---|---|---|---|
| JP | 2013-062780 A | | 4/2013 |
| JP | 2018-028650 A | | 2/2018 |
| JP | 2021030667 | * | 3/2021 |
| JP | 2023087326 A | * | 6/2023 |
| KR | 20180133318 A | * | 12/2018 |

* cited by examiner

*Primary Examiner* — Hoan H Tran
(74) *Attorney, Agent, or Firm* — VENABLE LLP

(57) ABSTRACT

An image forming apparatus to which a cartridge provided with a device including a memory is detachably mountable and in which an image is formed by using the cartridge mounted acquires first condition information which is image forming condition information and stores second condition information which is image forming condition information including a corresponding operation setting. A controller executes at least part of image formation control, using the first condition information or the second condition information selected on the basis of a verification result, in parallel to authentication processing, wherein execution of at least part of the image formation control is started after the first condition information is acquired and verified and before completion of the authentication processing, such that at least a part of a period of the image formation control overlaps with at least a part of a period of the authentication processing.

8 Claims, 16 Drawing Sheets

(a)

(b)

IMAGE FORMING APPARATUS

FIELD OF THE INVENTION AND RELATED ART

The present invention relates to an image forming apparatus, such as a copying machine, a printer, or a facsimile machine, using an electrophotographic type or an electrostatic recording type.

Conventionally, for example, to an image forming apparatus such as the printer using the electrophotographic type, a cartridge which is a consumable is made detachable mountable in some instances. The cartridge is typically constituted so that a developer container or a developing device is made detachably mountable to an apparatus main assembly of the image forming apparatus singly or together with another elements. Image formation control of the image forming apparatus depends on toner or the like as a developer accommodated in the cartridge, and therefore, there is a need to check whether or not a cartridge suitable for the image forming apparatus is mounted. In Japanese Laid-Open Patent Application No. 2013-62780, a constitution in which a cartridge is provided with an electric storing device and in which the cartridge is verified by checking a secret key stored in the electric storing device and a secret key stored in the image forming apparatus with each other is disclosed.

SUMMARY OF THE INVENTION

A principal object of the present invention is to suppress that a time required for initial check in order to authenticate a cartridge.

This object is accomplished by an image forming apparatus according to the present invention.

According to an aspect of the present invention, there is provided an image forming apparatus to which a cartridge provided with a device including a memory is detachably mountable and in which an image is formed by using the cartridge mounted, the image forming apparatus comprising: a controller configured to execute image formation control; an acquiring portion configured to acquire first condition information which is image forming condition information from the memory in communication with the device; a verifying portion configured to verify the first condition information acquired from the memory; a second condition information storing portion in which second condition information which is image forming condition information is stored; and an authenticating portion configured to execute authentication processing for authenticating the cartridge in communication with the device, wherein the controller executes at least a part of the image formation control, using the first condition information or the second condition information selected on the basis of a verification result by the verifying portion, in parallel to the authentication processing by the authenticating portion.

Further features of the present invention will become apparent from the following description of exemplary embodiments with reference to the attached drawings.

Figure 3:
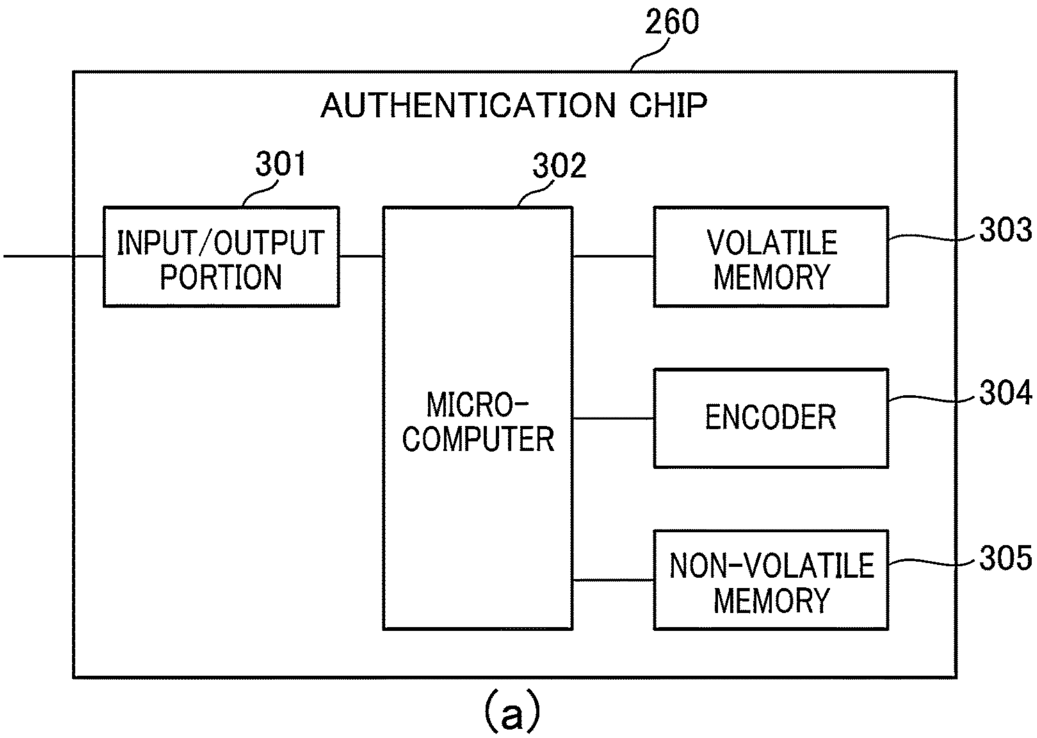
Figure 3:
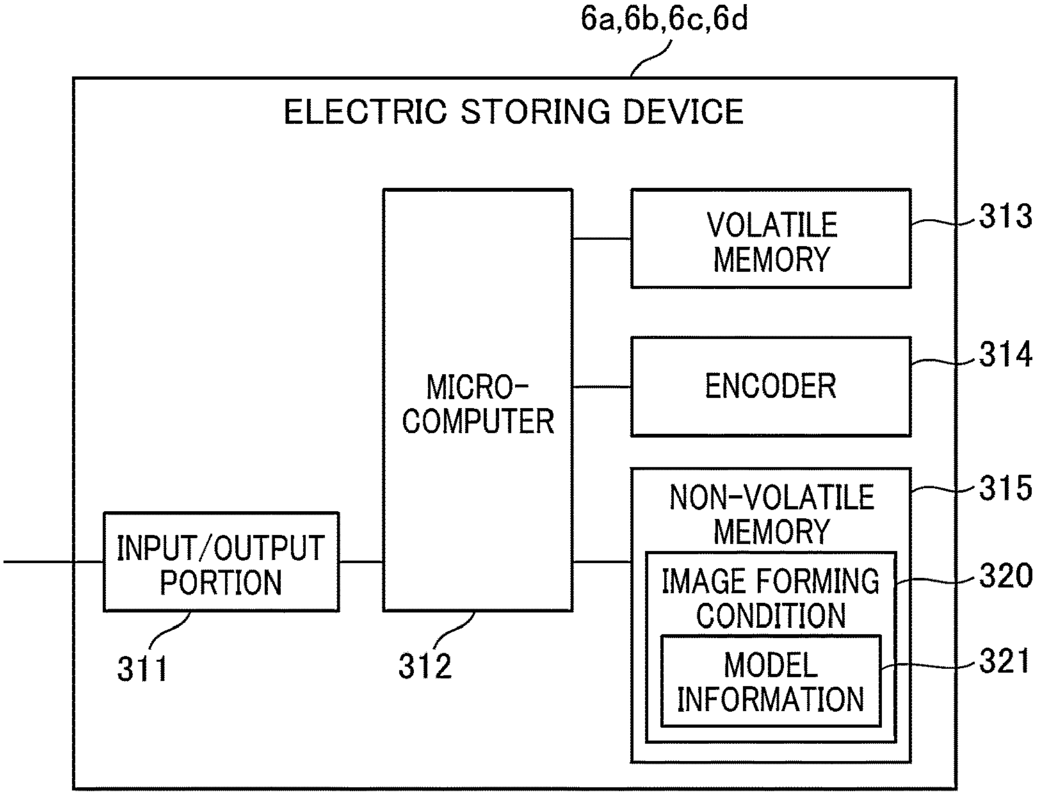

Parts (a) and (b) of FIG. 3 are block diagrams of an authentication chip and an electric storing device, respectively, in the embodiment 1.

Figure 4:
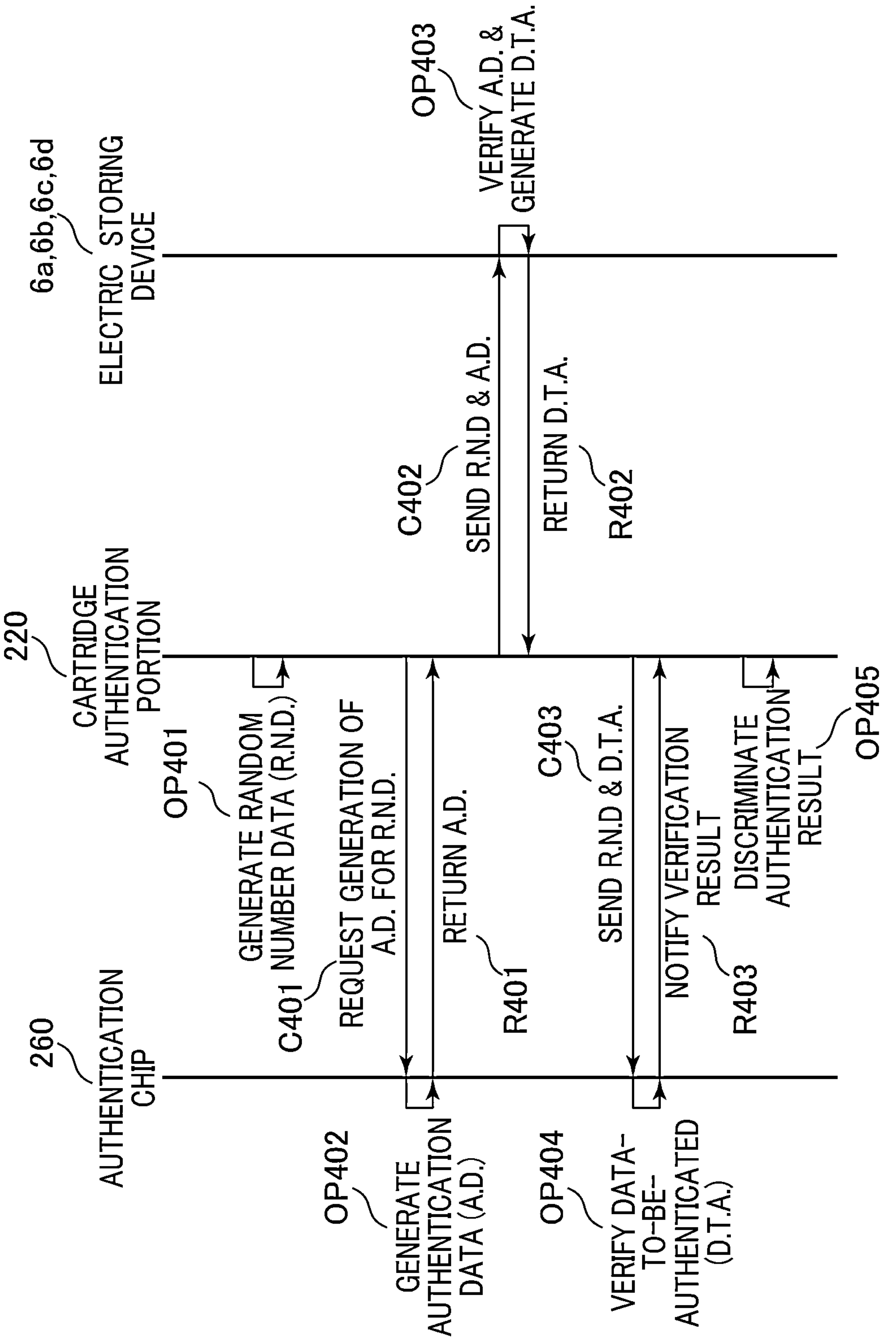

FIG. 4 is a sequence chart of an example of an authenticating method.

Figure 5:
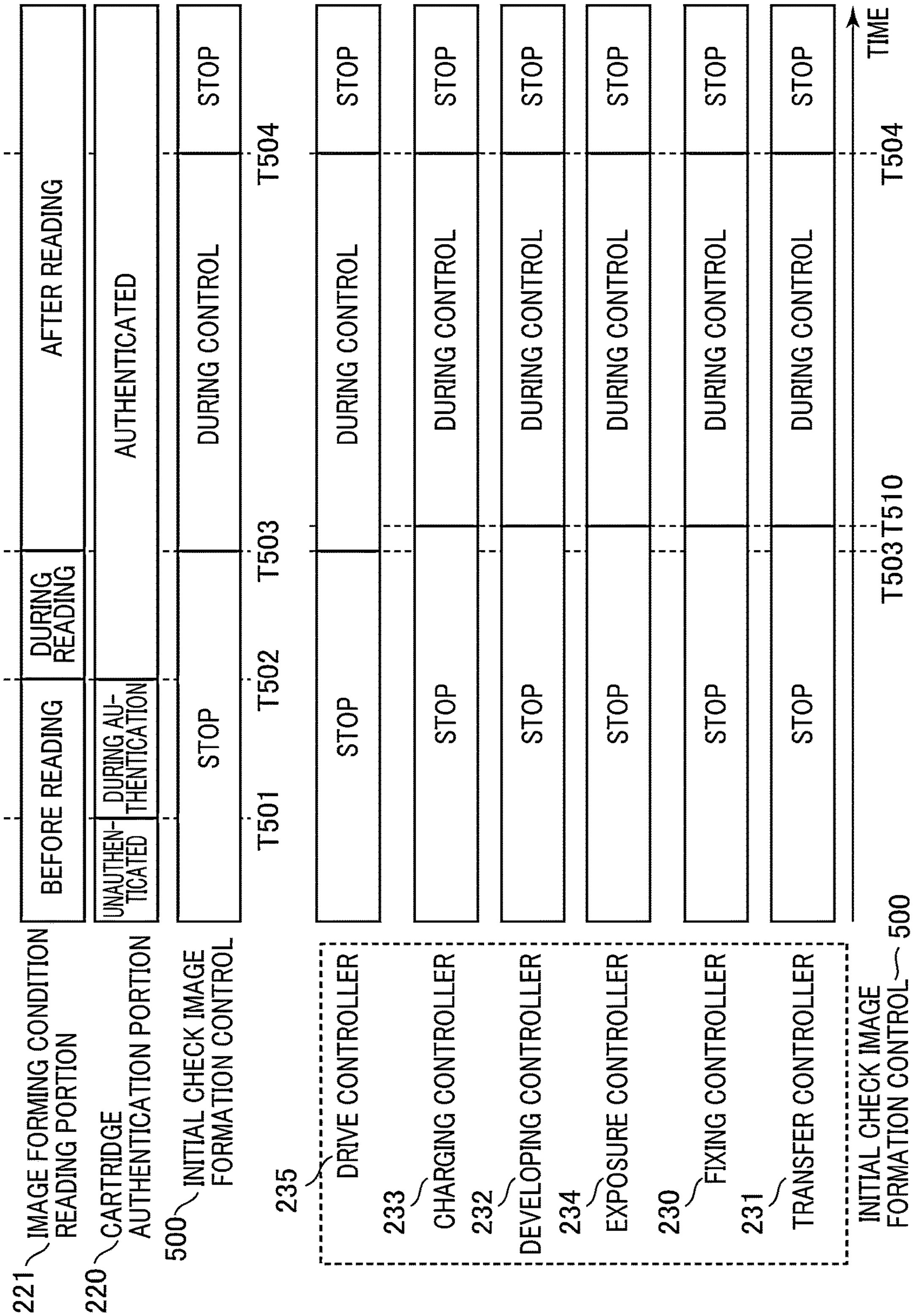

FIG. 5 is a timing chart of a conventional initial check.

Figure 6:
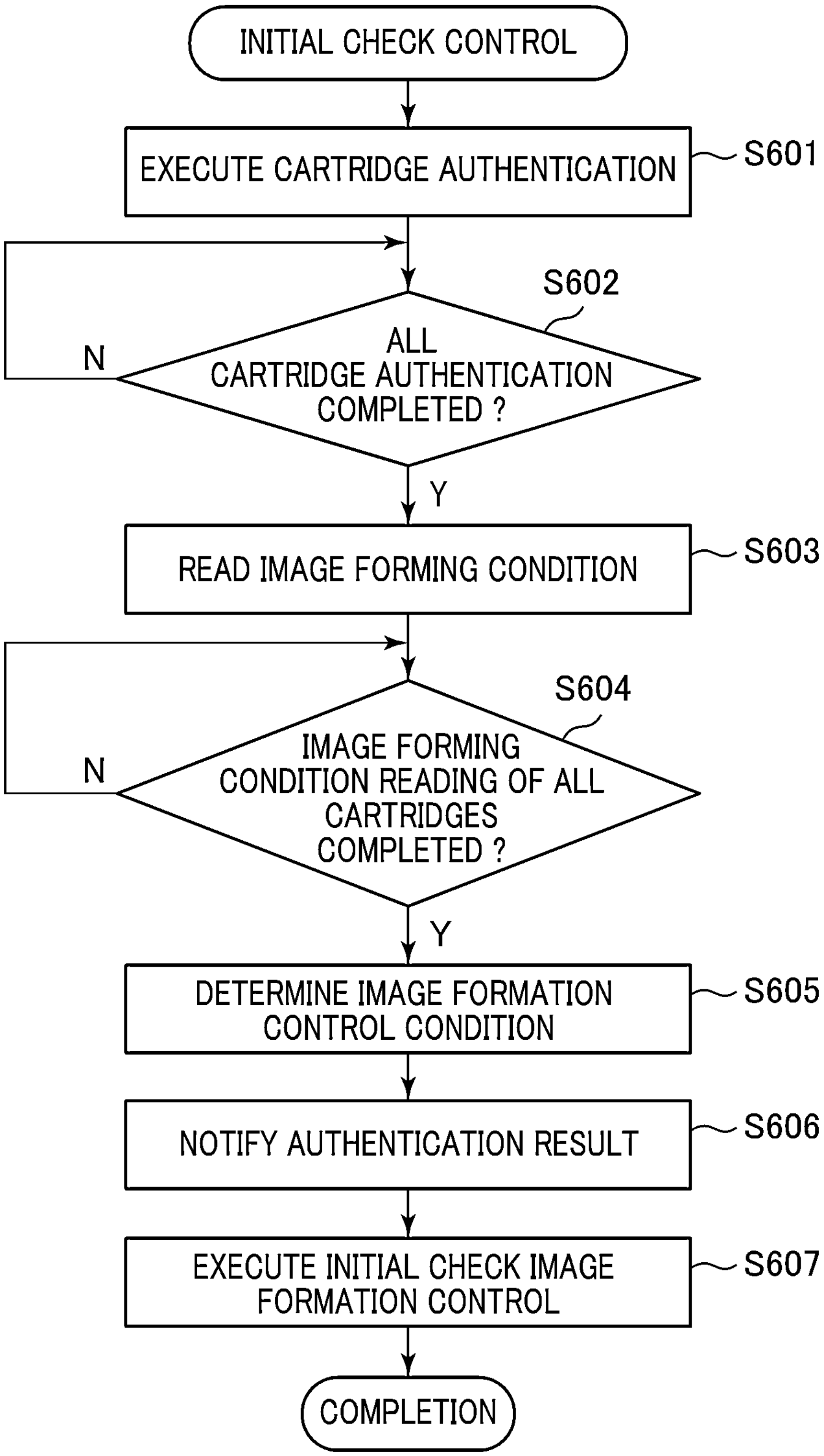

FIG. 6 is a flowchart of the conventional initial check.

Figure 7:
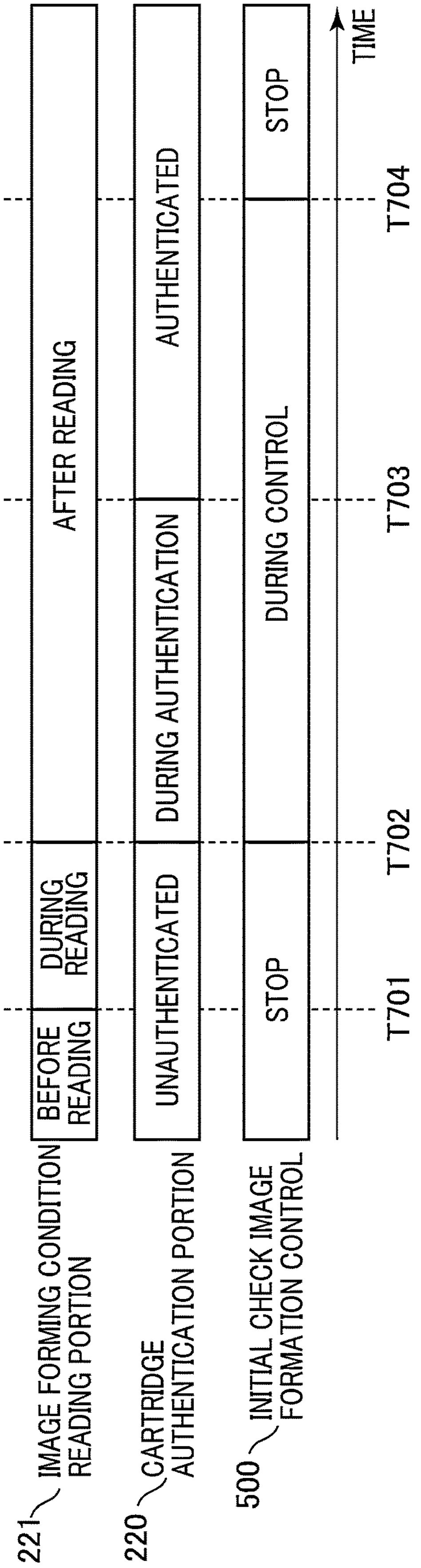

FIG. 7 is a timing chart of an initial check in the embodiment 1.

Figure 8:
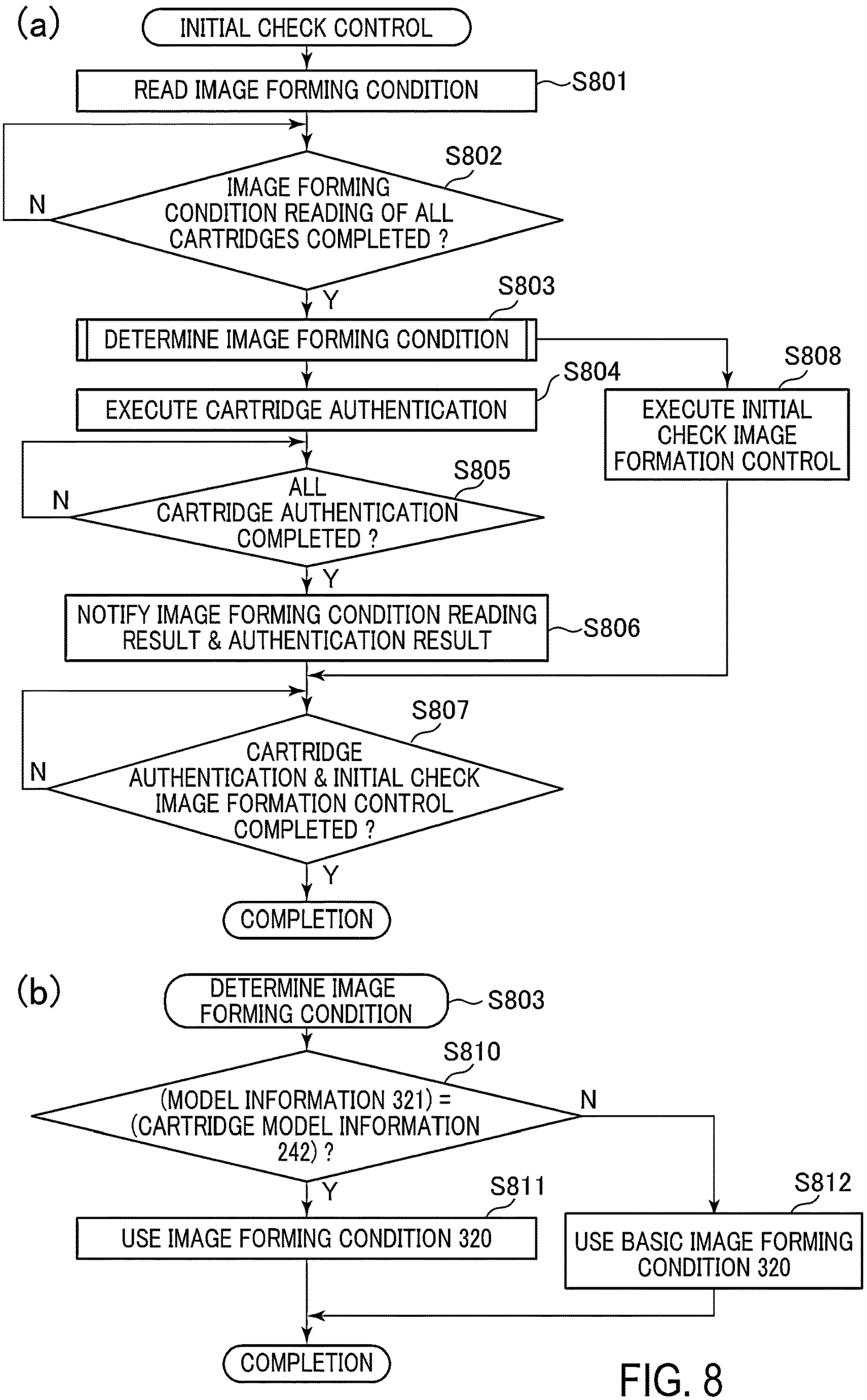

Parts (a) and (b) of FIG. 8 are flowcharts of the initial check in the embodiment 1.

Figure 9:
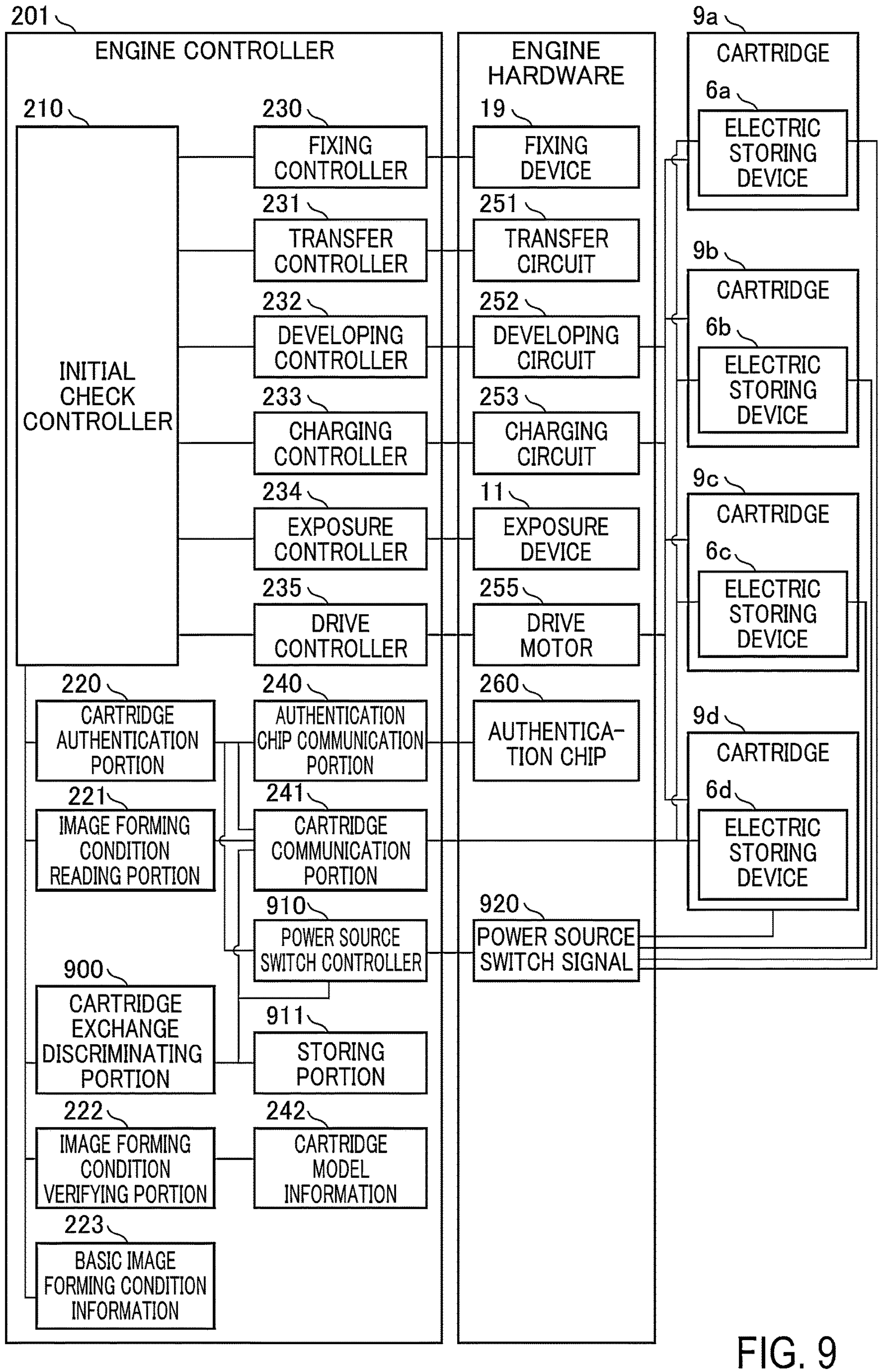

FIG. 9 is a block diagram showing a system constitution of an image forming apparatus of an embodiment 2.

Figure 10:
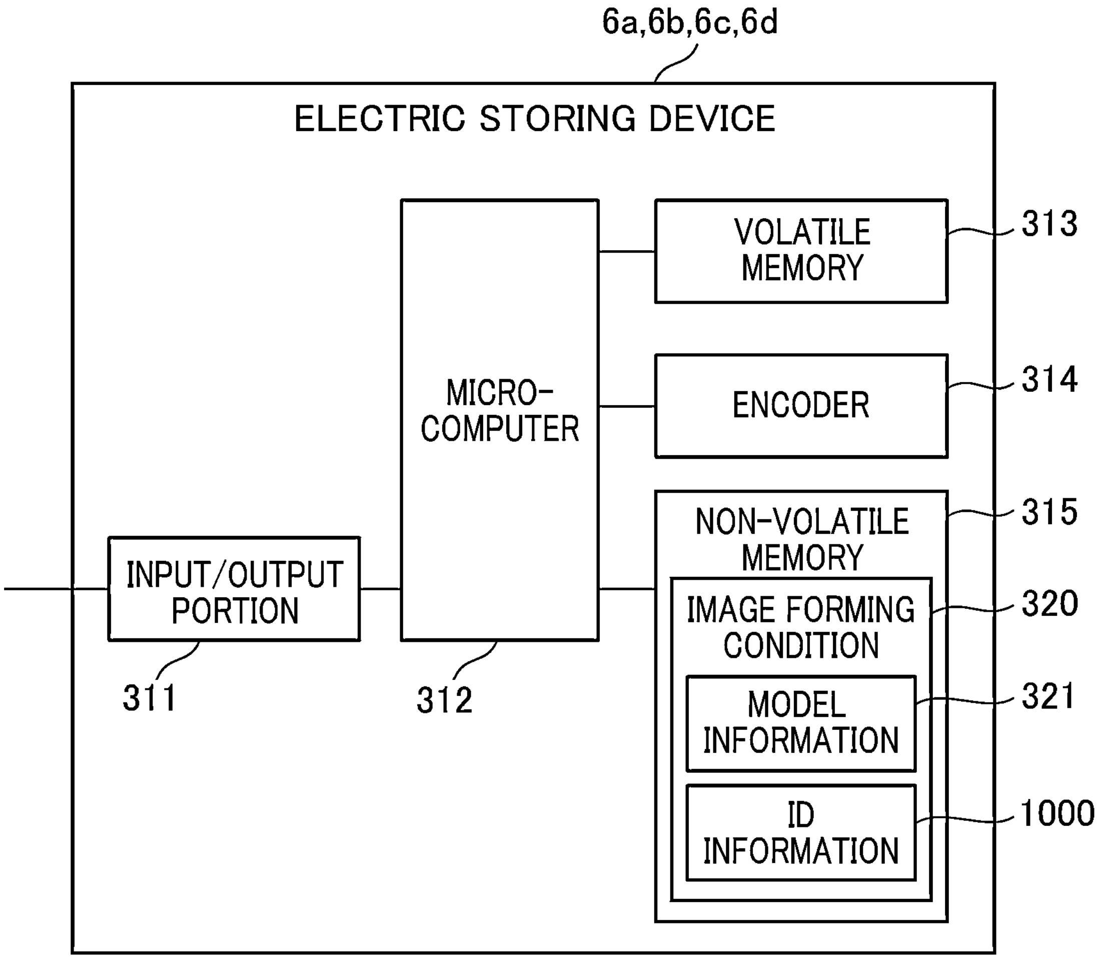

FIG. 10 is a block diagram of an electric storing device in the embodiment 2 and an embodiment 3.

Figure 11:
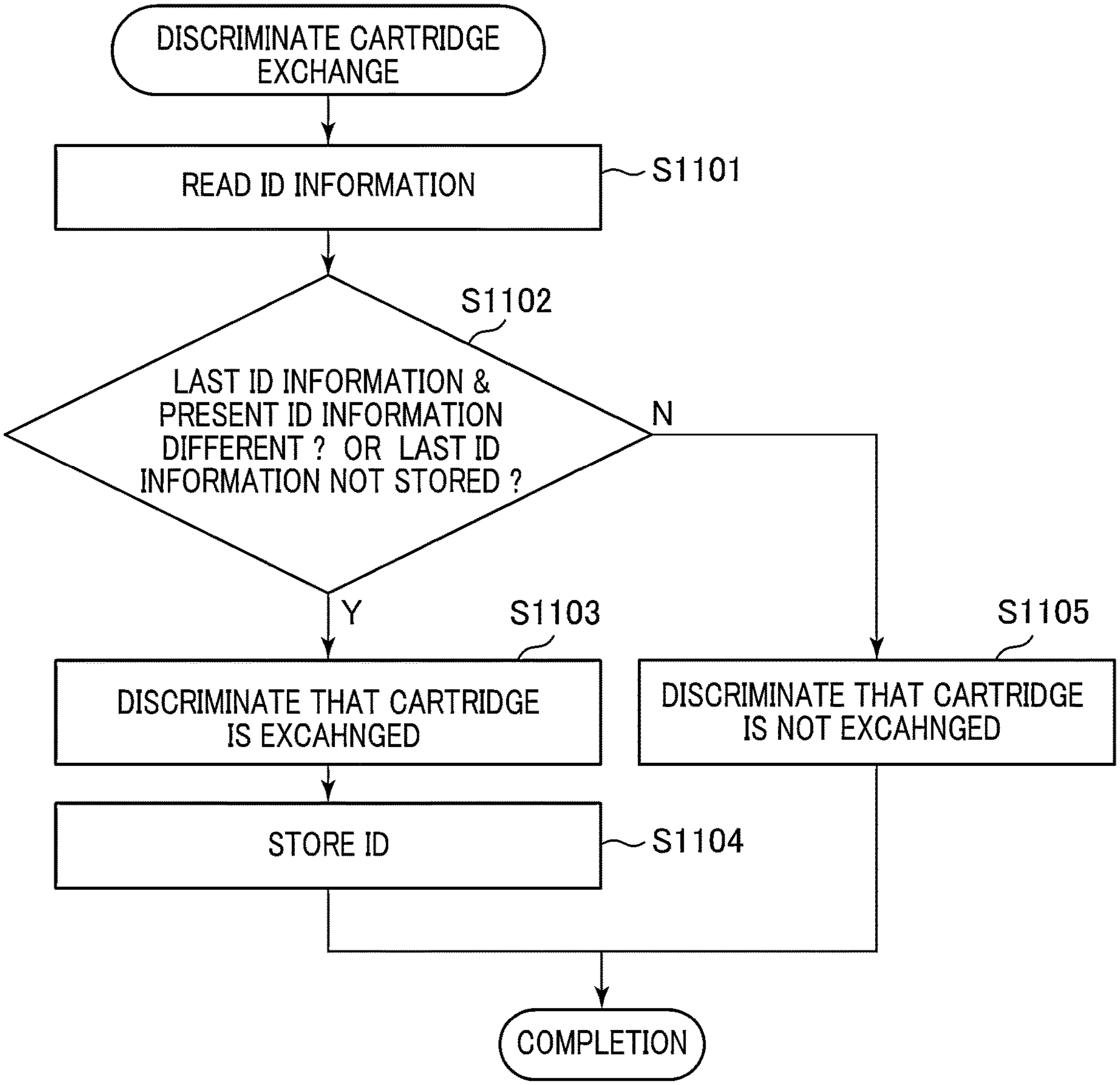

FIG. 11 is a flowchart of cartridge exchange discrimination in the embodiment 2.

Figure 12:
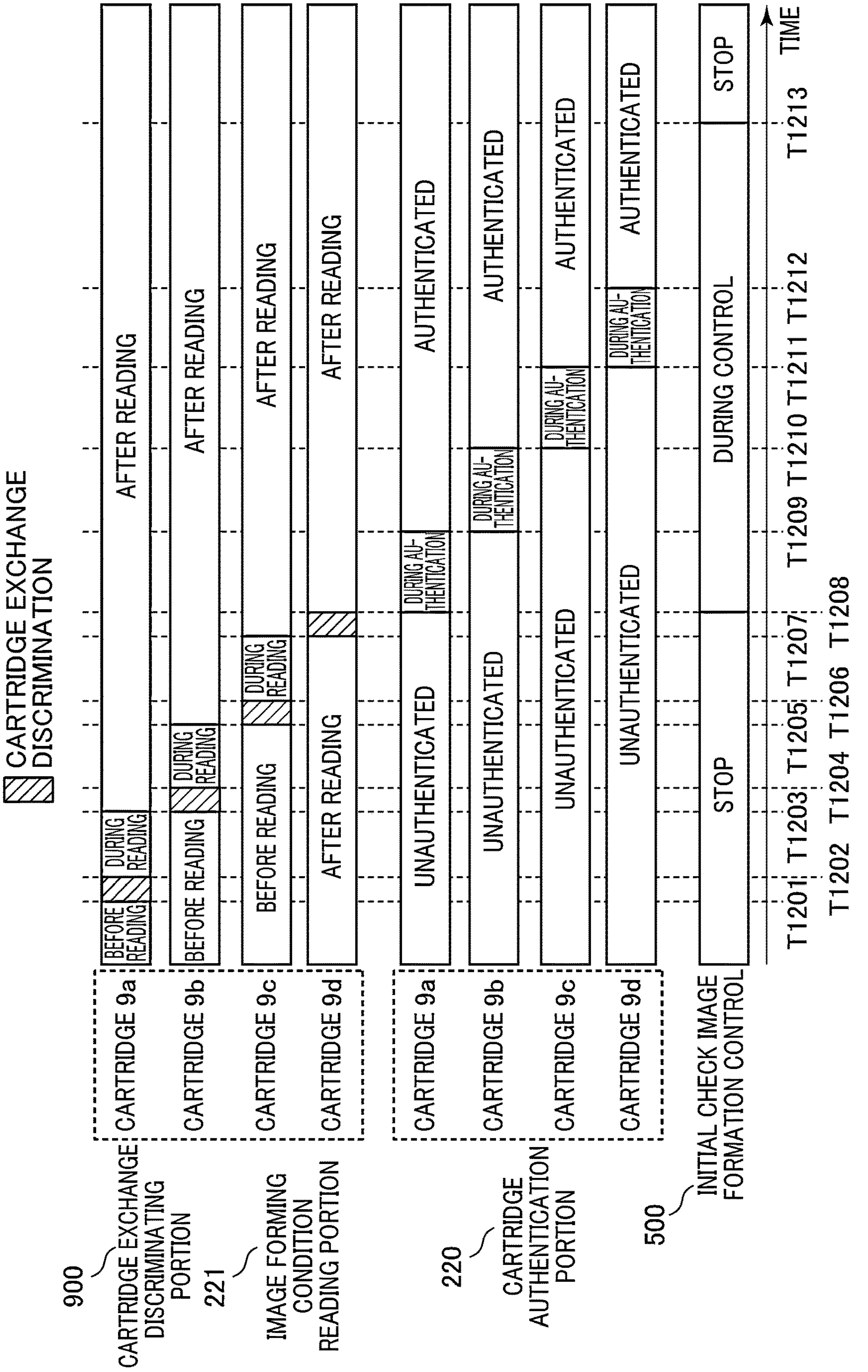

FIG. 12 is a timing chart of an initial check in the embodiment 2.

Figure 13:
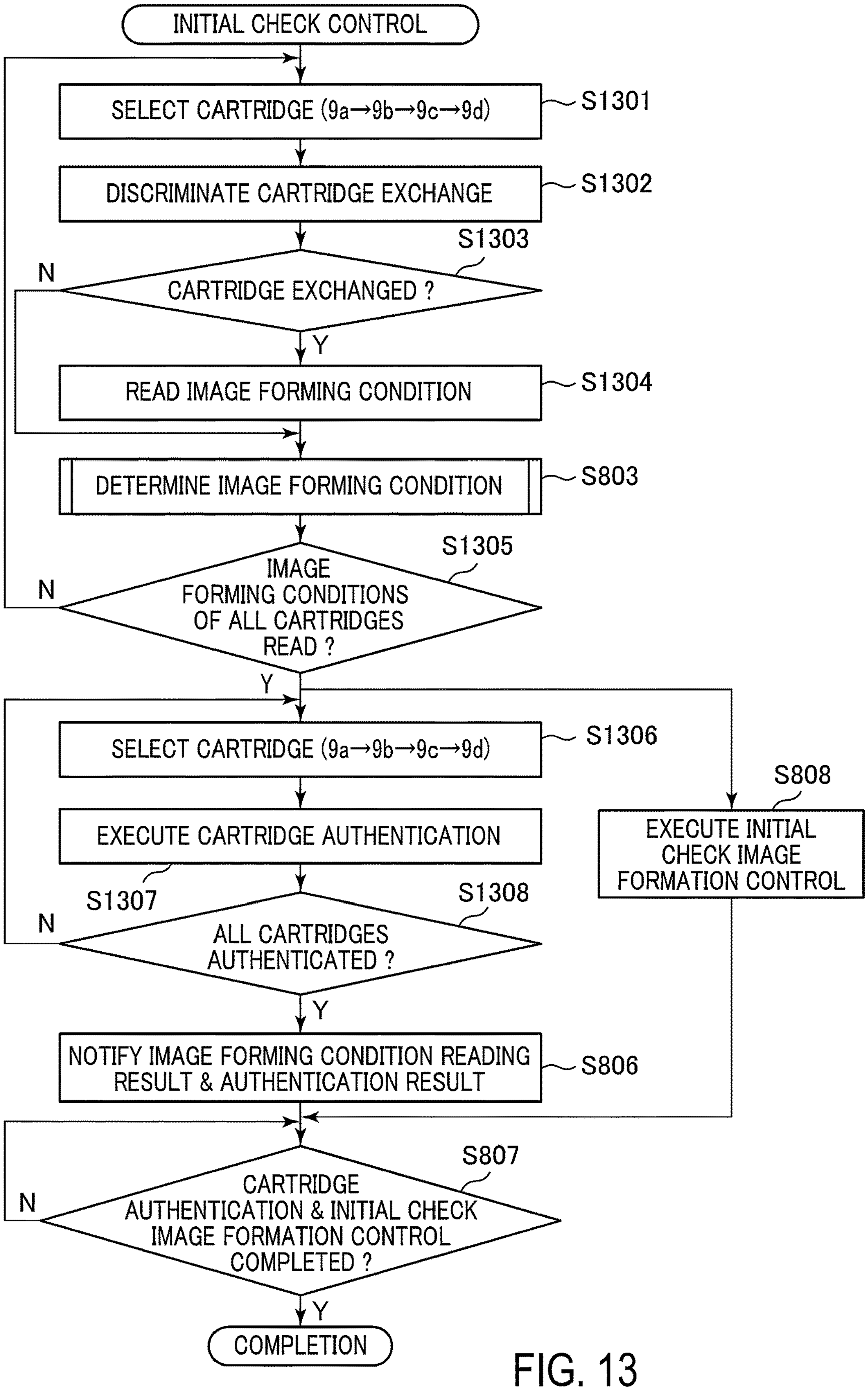

FIG. 13 is a flowchart of the initial check in the embodiment 2.

Figure 14:
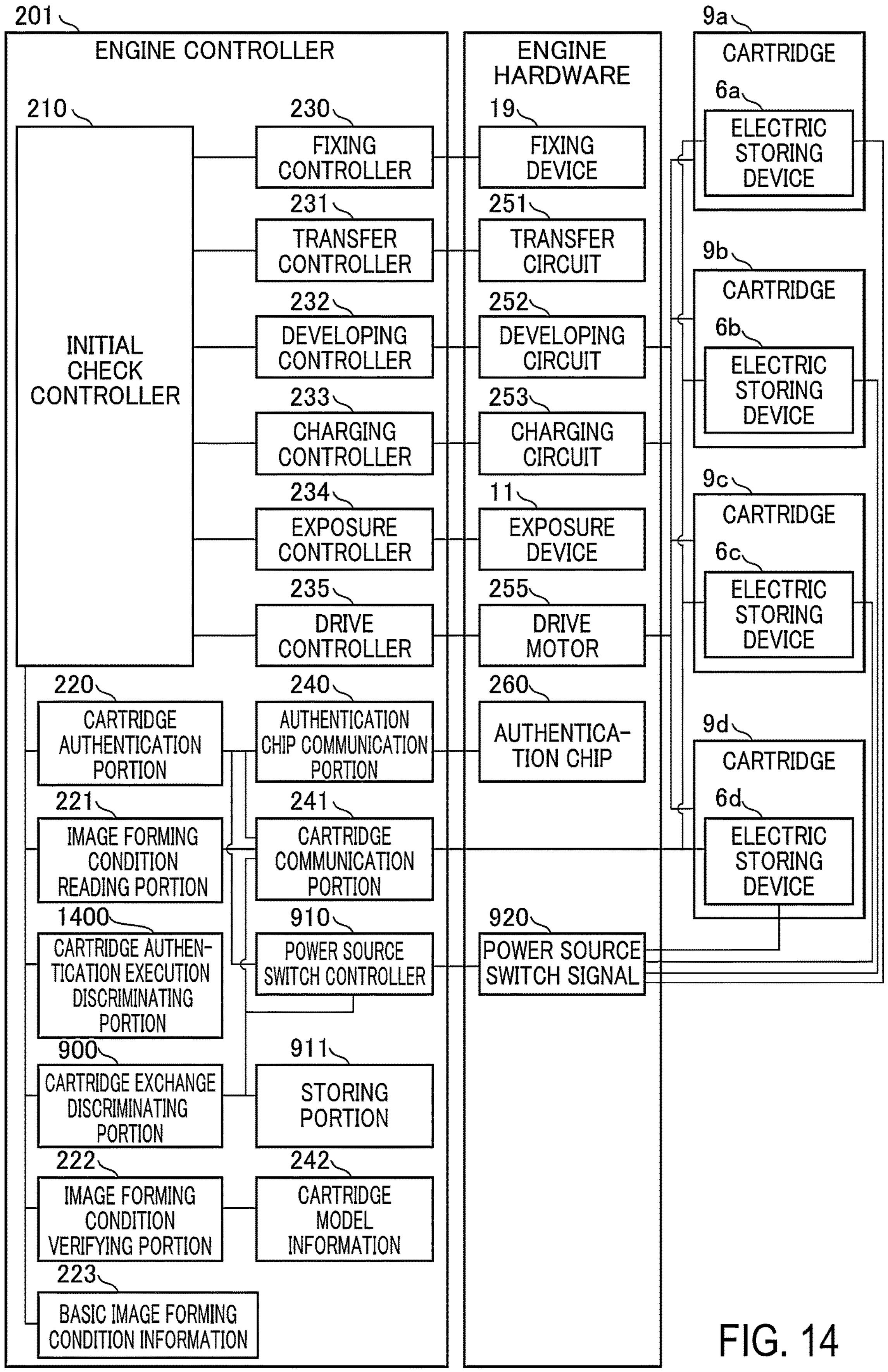

FIG. 14 is a block diagram showing a system constitution of an image forming apparatus of the embodiment 3.

Figure 15:
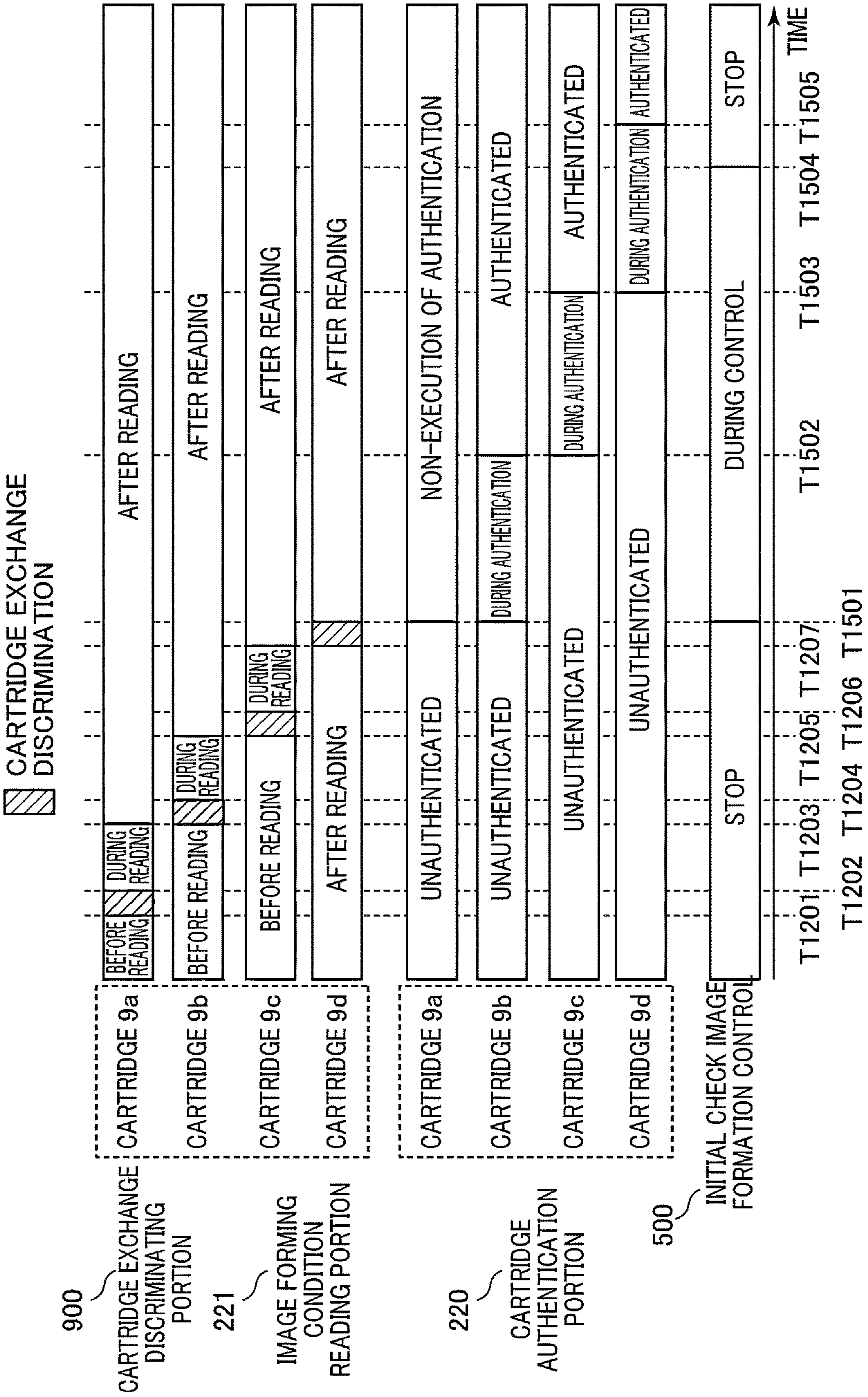

FIG. 15 is a timing chart of an engine controller in the embodiment 3.

Figure 16:
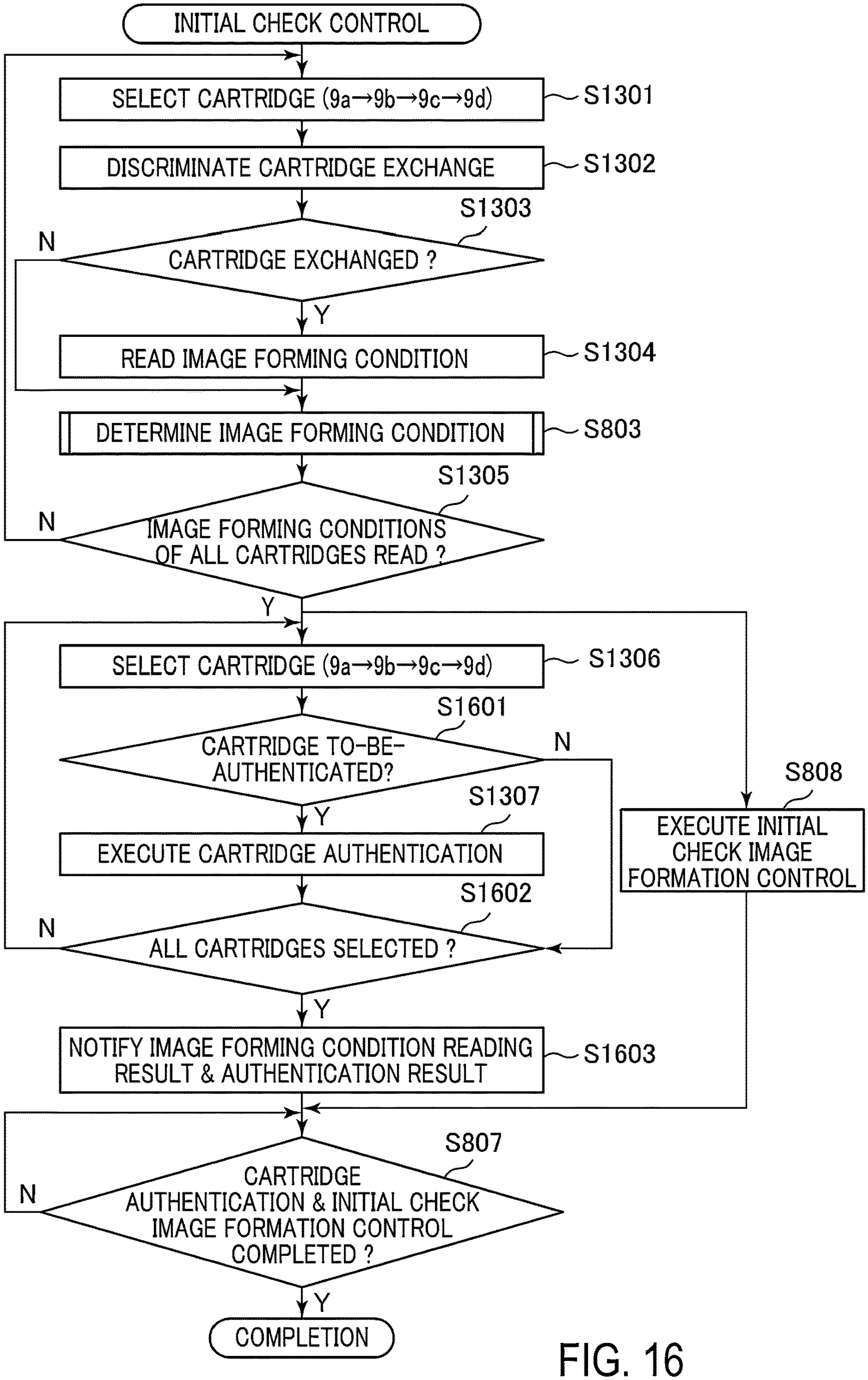

FIG. 16 is a flowchart of the initial check in the embodiment 3.

DESCRIPTION OF THE EMBODIMENTS

In the following, an image forming apparatus according to the present invention will be described specifically with reference to the drawings.

Embodiment 1

1. General Constitution and Operation of Image Forming Apparatus

Figure 1:
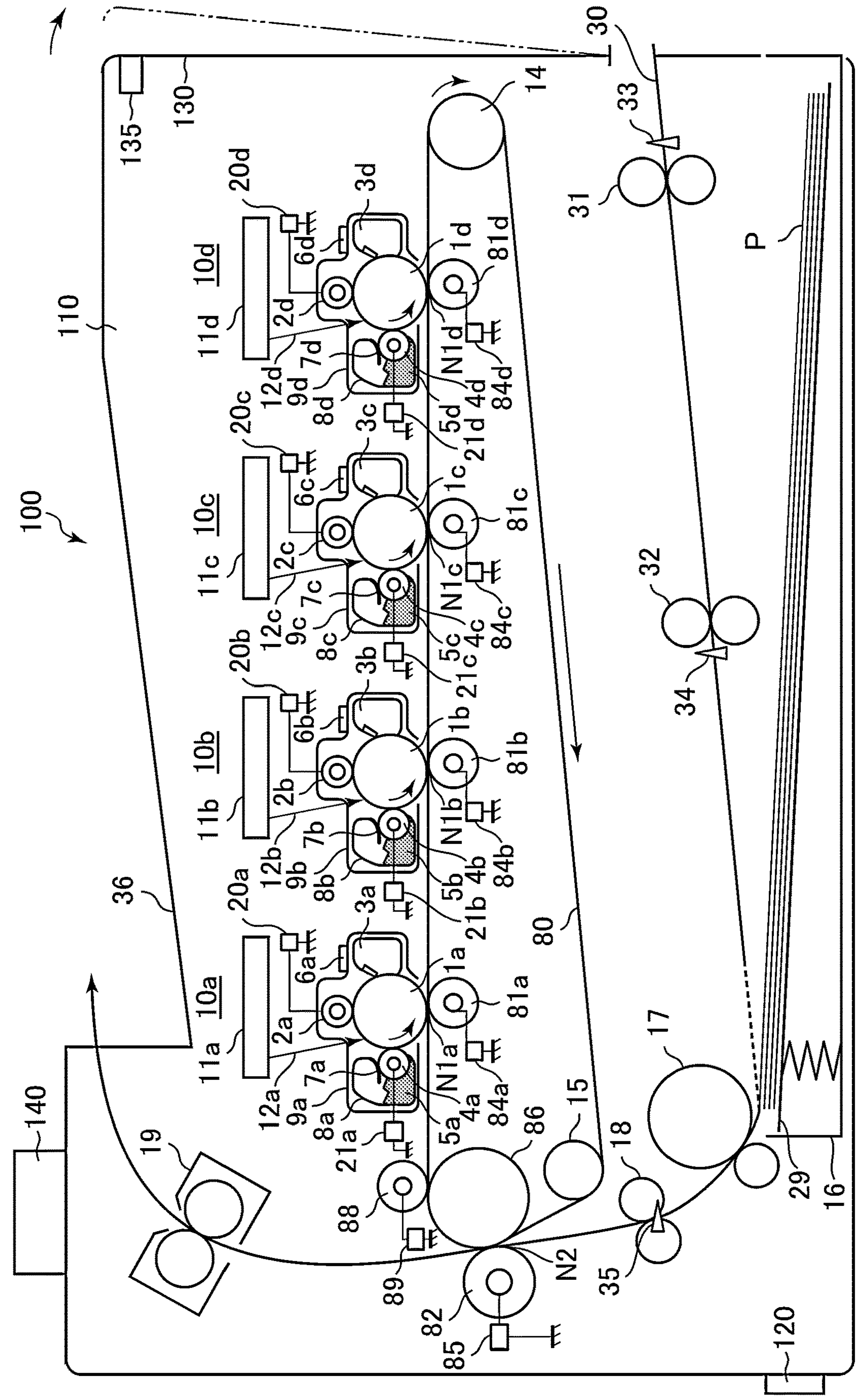
FIG. 1 is a schematic sectional view of an image forming apparatus.

FIG. 1 is a schematic sectional view of an image forming apparatus 100 of an embodiment 1. The image forming apparatus 100 of this embodiment is a laser printer of a tandem type in which a full-color image is capable of being formed by using an electrophotographic type and in which an intermediary transfer type is employed. The image forming apparatus 100 is capable of forming and outputting an image on a sheet-like recording material P on the basis of an image signal (image information) inputted from an external device (not shown) such as a personal computer.

The image forming apparatus 100 includes, as a plurality of stations, first to fourth stations 10*a*, 10*b*, 10*c*, and 10*d* for forming toner images of colors of yellow (Y), magenta (M), cyan (C) and black (K), respectively. As regards elements having the same or corresponding functions or constitutes provided for the respective colors, these elements are collectively described in some instances by omitting suffixes, a, b, c, and d of reference numerical of symbols representing the elements provided for associated colors. In this embodiment, the station 10 is constituted by including a photosensitive drum 1, a charging roller 2, an exposure device 11, a developing device 8, a primary transfer roller 81, a cleaning device 3, and the like which are described later.

(Image Forming Portion)

The station 10 is provided with the photosensitive drum 1 which is a rotatable drum type (cylindrical) photosensitive member (electrophotographic photosensitive member) as an image bearing member. In this embodiment, the photosensitive drum 1 is an OPC (organic photoconductor) photosensitive drum. The OPC photosensitive drum 1 is constituted by laminating, on a metal cylinder, a plurality of lamination layers of functional organic materials including a carrier generating layer for generating an electric charge through sensitization, a charge transporting layer for transporting a generated electric charge, and the like. An outermost layer thereof is low in electrical conductivity and is almost electrically insulative. In this embodiment, the photosensitive drum 1 is constituted by applying an organic photoconductor (OPC) layer onto an outer peripheral surface of an aluminum cylinder. The photosensitive drum 1 is rotatably supported by flanged at opposite end portions thereof with respect to a rotational axis direction, and a driving force is transmitted from a driving motor (not shown) to one end portion, whereby the photosensitive drum 1 is rotationally driven at a predetermined peripheral speed (process speed) is an arrow direction (counterclockwise direction) in FIG. 1.

A surface of the rotating photosensitive drum 1 is electrically charged uniformly to a predetermined polarity (negative polarity in this embodiment) and a predetermined potential by the charging roller 2 which is a roller-shaped charging member as a charging means.

The charging roller 2 is constituted by an electroconductive roller and is disposed in contact with the surface of the photosensitive drum 1, so that the surface of the photosensitive drum 1 is uniformly charged while being rotated with rotation of the photosensitive drum 1. To the charging roller 2, a charging power source 20 which is a charging voltage applying portion as a voltage supplying means is connected. During charging, to the charging roller 2, a DC voltage or a predetermined charging voltage (charging bias) which is an oscillating voltage in which the DC voltage and an AC voltage are superimposed is applied by the charging power source 20. Further, by generation of electric discharge at least in one of minute air gaps formed on a side upstream and downstream of a contact nip between the surface of the charging roller 2 and the surface of the photosensitive drum 1, the surface of the photosensitive drum 1 is charged.

The charged surface of the photosensitive drum 1 is subjected to scanning exposure by an exposure device 11 as an exposure means, so that an electrostatic latent image (electrostatic image) is formed on the photosensitive drum 1. In this embodiment, the exposure device 11 is constituted by a scanner unit for scanning the photosensitive drum surface with laser light through a polygon mirror, so that the surface of the photosensitive drum 1 is irradiated with a scanning beam 12 modulated on the basis of the image signal. The polygon mirror is irradiated with image light (laser light), corresponding to the image signal, from a laser diode (not shown).

The electrostatic latent image formed on the photosensitive drum 1 is developed (visualized) by supplying thereto toner as a developer by the developing device (developing unit) 8, so that a toner image (toner picture, developer image) is formed on the photosensitive drum 1. The developing device 8 is constituted by including a developer accommodating portion 5 in which a non-magnetic one component developer (toner) as the developer is accommodated, a developing roller 4 as a developer carrying member (developing member), a developer applying blade 7 as a developer regulating member, and the like. In the developer accommodating portions 5*a*, 5*b*, 5*c*, and 5*d* of the developing devices 8*a*, 8*b*, 8*c*, and 8*d*, toner of yellow, magenta, cyan, and black, respectively, is accommodated. The developing roller 4 is disposed adjacent to the surface of the photosensitive drum 1. To the developing roller 4, a developing power source 21 which is a developing voltage applying portion as a voltage supplying means is connected. During development, the developing roller 4 is contacted to the surface of the photosensitive drum 1, and is rotationally driven by a driving force transmitted from a driving motor (not shown) of a driving portion. Further, during the development, to the developing roller 4, a predetermined developing voltage (developing bias) is applied by the developing power source 21. By this, the toner is supplied from the developing roller 4 onto the electrostatic latent image on the photosensitive drum 1, so that a toner image is formed. In this embodiment, the toner charged to the same polarity (negative polarity in this embodiment) as a charge polarity of the photosensitive drum 1 is deposited on an exposure portion on the photosensitive drum 1 lowered in absolute value of a potential by exposure to light after uniform charging (reverse development type). In this embodiment, a normal charge polarity of the toner which is a principal charge polarity of the toner during the development is the negative polarity.

Opposing the four photosensitive drums 1*a*, 1*b*, 1*c*, and 1*d*, an intermediary transfer belt 80 constituted by an endless belt as an intermediary transfer member is provided. The intermediary transfer belt 80 is supported by three rollers, as a plurality of stretching rollers (stretching members), consisting of a secondary transfer opposite roller 86, a driving roller 14, and a tension roller 15, and is stretched so as to maintain appropriate tension. By rotational drive of the driving roller 14 by a driving force transmitted from a driving motor (not shown) of a driving source, the intermediary transfer belt 80 is rotated (circumferentially moved, circulated and moved) at a peripheral speed (process speed) substantially equal to the peripheral speed of the photosensitive drum 1 in an arrow direction (clockwise direction). On an inner peripheral surface side of the intermediary transfer belt 80, primary transfer rollers 81*a*, 81*b*, 81*c*, and 81*d* which are roller-shaped primary transfer members as a primary transfer means are provided opposed to the four photosensitive drums 1*a*, 1*b*, 1*c*, and 1*d*, respectively, with respect to the intermediary transfer belt 80 sandwiched therebetween. The primary transfer roller 81 is pressed toward the photosensitive drum 1 and is contacted to the photosensitive drum 1 via the intermediary transfer belt 80, thus forming a primary transfer portion (primary transfer nip) N1 which is a contact portion between the photosensitive drum 1 and the intermediary transfer belt 80. To the primary transfer rollers 81*a*, 81*b*, 81*c*, and 81*d*, primary transfer bias power sources 84*a*, 84*b*, 84*c*, and 84*d*, respectively, which are primary transfer voltage applying portions as a voltage applying means are connected. Each of the driving roller 14, the tension roller 15, and the secondary transfer opposite roller 86 is connected to ground potential (electrically grounded). The stretching rollers other than the driving roller 14, and the respective primary transfer rollers 81 are rotated with rotation of the intermediary transfer belt 80.

The toner image formed on the photosensitive drum 1 is transferred (primary-transferred) onto the rotating intermediary transfer belt 13 as a transfer-receiving member by the action of the primary transfer roller 81 in the primary transfer nip N1. During primary transfer, to the primary transfer roller 81, a predetermined primary transfer voltage (primary transfer bias) which is a DC voltage of a polarity (positive polarity in this embodiment) opposite to the normal charge polarity of the toner is applied by a primary transfer power source 84. By this, an electric charge of the positive polarity is imparted from the primary transfer roller 81 to the intermediary transfer belt 80, so that the toner image formed of the toner of the negative polarity on the photosensitive drum 1 is transferred onto the intermediary transfer belt 80 which is being contacted to the photosensitive drum 1. For example, during full-color image formation, toner image of yellow, magenta, cyan, and black formed on the respective photosensitive drums 1*a*, 1*b*, 1*c*, and 1*d* are successively primary-transferred superposedly onto the intermediary transfer belt 80, so that a multi-color image is formed on the intermediary transfer belt 80. The toner (primary transfer residual toner) remaining on the photosensitive drum 1 after primary transfer is removed and collected from the photosensitive drum 1 by a cleaning device (cleaning unit) as a cleaning means.

On an outer peripheral surface side of the intermediary transfer belt 80, in a position opposing the secondary transfer opposite roller 86 through the intermediary transfer belt 80, a secondary transfer roller 82 which is a roller-shaped secondary transfer member as a secondary transfer means is disposed. The secondary transfer roller 82 is pressed toward the secondary transfer opposite roller 86 and is contacted to the secondary transfer opposite roller 86 via the intermediary transfer belt 80, thus forming a secondary transfer portion (secondary transfer nip) N2 which is a contact portion between the intermediary transfer belt 80 and the secondary transfer roller 82. The secondary transfer roller 82 is rotated with the rotation of the intermediary transfer belt 80. The intermediary transfer belt 80 electrostatically attracts the toner to the outer peripheral surface thereof opposing the photosensitive drums 1*a*, 1*b*, 1*c*, and 1*d*. To the secondary transfer roller 82, a secondary transfer power source 85 which is a secondary transfer voltage applying portion as a voltage supplying means is connected.

The toner image formed on the intermediary transfer belt 80 is transferred (secondary-transferred) onto the transfer material P conveyed while being nipped between the intermediary transfer belt 80 and the secondary transfer roller 82 in the secondary transfer portion N2. During a secondary transfer step, to the secondary transfer roller 82, a secondary transfer voltage (secondary transfer bias), which is a DC voltage of the polarity (positive polarity in this embodiment) opposite to the normal charge polarity of the toner is applied by the secondary transfer power source 85. By an electric field formed between the secondary transfer roller 82 and the secondary transfer opposite roller 86 under application of the secondary transfer voltage to the secondary transfer roller 82, dielectric polarization generates between the intermediary transfer belt 80 and the recording material P, so that an electrostatic attraction force generates. The recording material P is conveyed from a feeding portion described later toward the secondary transfer portion N2.

The toner (secondary transfer residual toner) remaining on the intermediary transfer belt 80 after the secondary transfer is charged to the polarity (positive polarity in this embodiment) opposite to the normal charge polarity by a toner charging roller 88 as a toner charging means. This toner is transferred onto the photosensitive drum 1 in the primary transfer portion N1 (for example, a most upstream primary transfer portion N1*a* in a surface movement direction of the intermediary transfer belt 80), and is collected by being removed from the photosensitive drum 1 by the cleaning device 3. To the toner charging roller 88, a toner charging voltage (toner charging bias) of the polarity (positive polarity in this embodiment) opposite to the normal charge polarity of the toner is applied by a toner charging power source 89.

In each station 10, the photosensitive drum 1, the charging roller 2, the developing device 8, and the cleaning device 3 constitute an integral-type cartridge (process cartridge) 9 detachably mountable to an apparatus main assembly 110 of the image forming apparatus 100. To the cartridge 9, an electric storing device 6 in which information on image formation is stored is mounted. Incidentally, in this embodiment, the apparatus main assembly 110 is a portion excluding the process cartridges 9*a*, 9*b*, 9*c*, and 9*d* from the image forming apparatus 100.

(Feeding Portion)

The image forming apparatus 100 includes a body cassette 16 as a feeding portion. In the case where the recording materials (recording medium, transfer material, sheet) P are fed from the body cassette 16, a body cassette bottom plate 29 is raised by driving a cassette pick-up roller 17 as a feeding member, so that the recording materials P accommodated in the body cassette 16 are pushed up. An uppermost sheet of the recording materials P contacts the cassette pick-up roller 17 and is separated and fed by rotation of the cassette pick-up roller 17. The recording material P sent from the body cassette 16 is conveyed to a registration roller pair 18. Then, this recording material P is conveyed toward the secondary transfer portion N2 by the registration roller pair 18 while being timed to the toner image on the intermediary transfer belt 80. Further, the image forming apparatus 100 is also capable of feeding the recording material P from a manual feeding tray 30 as a feeding portion. In the case where the recording material P is fed from the manual feeding tray 30, the recording material P placed on the manual feeding tray 30 is conveyed by manual conveying roller pairs 31 and 32, and thereafter is conveyed to the registration roller pair 18 by the cassette pick-up roller 17. This recording material P is then conveyed toward the secondary transfer portion N2 similarly in the above-described manner. In a conveying path of the recording material P, recording material sensors 33, 34, and 35 are provided, and detection results of these sensors are used in control of a conveying timing of the recording material P by the registration roller pair 18, or the like.

(Fixing Portion)

The recording material P on which the toner image is transferred in the secondary transfer portion N2 is conveyed to a fixing device 19 as a fixing means. The fixing device 19 fixes (melts, sticks) the toner image on the recording material P by applying heat and pressure to the toner image transferred on the recording material P. In this embodiment, the fixing device 19 includes a fixing belt and an elastic pressing roller. The elastic pressing roller nips the fixing belt between itself and a belt guiding member and forms a fixing nip with a predetermined width under application of a predetermined press-contact force. In a state in which the fixing nip is raised in temperature and is temperature-controlled, the recording material P which is conveyed from the image forming portion and on which the unfixed toner image is carried is introduced into between the fixing belt and the elastic pressing roller in the fixing nip. At this time, the recording material P is introduced into the fixing nip in a state in which an image surface thereof on which the unfixed toner image on the recording material P opposes a fixing belt surface.

In a state in which the image surface of the recording material P closely contacts an outer peripheral surface of the fixing belt in the fixing nip, the fixing belt and the recording material P are nipped and conveyed together through the fixing nip. In this process, the toner image is heated and fixed on the recording material P by being heated by the fixing belt.

(Other Constitutions)

The image forming apparatus 100 is provided with a power source switch 120 for switching turning-on/off of the power source to the image forming apparatus 100. When the power source switch 120 is turned on (ON), it becomes possible to control the respective portions of the image forming apparatus 100 by an engine controller 201 described later.

Further, the image forming apparatus 100 is provided with a cartridge door 130 which is an openable member for causing a user to access the cartridge 9. The user opens an inside of the apparatus main assembly 110 by opening the cartridge door 130, so that the cartridge 9 can be made detachably mountable to the apparatus main assembly 110. Further, the image forming apparatus 100 is provided with a door sensor 135 as an open/close detecting means for detecting open/close (at least one of an open state and a closed state) of the cartridge door 130. In a state in which the power source of the image forming apparatus 100 is turned on, in each of the case where the cartridge door 130 is changed from the closed state to the open state and the case where the cartridge door 130 is changed from the open state to the closed state, the door sensor 135 inputs, to the engine controller 201, a signal changed correspondingly thereto.

Further, the image forming apparatus 100 is provided with an operating portion (operating panel) 140. The operating portion 140 includes an input portion (keys and the like) as an inputting means for inputting various settings or the like to the engine controller 201 by an operation of the user, and a display portion (liquid crystal panel or the like) as a displaying means for displaying information to the user by control of the engine controller 201. Incidentally, the operating portion 140 may be constituted by a touch panel or the like having functions of the input portion and the display portion.

2. Initial Check

The image forming apparatus 100 performs an initial check when the power source of the image forming apparatus 100 is turned on by the user (when the image forming apparatus 100 is actuated) or when the cartridge door 130 is opened or closed by the user. Incidentally, a former timing is also simply referred to as an "at the power source ON" or the like, and a latter timing is also simply referred to as an "at the cartridge door open/close" or the like. During the initial check, the image forming apparatus 100 makes preparation for carrying out printing by making a hardware check by controlling cartridge authentication, reading of information from the electric storing device 6 of the cartridge 9, and the image forming portion or the like. When the initial check is normally completed, the image forming apparatus 100 is shifted to a printable state.

In this embodiment, the image forming apparatus 100 executes reading of an image forming condition from the cartridge 9 and verification of the read image forming condition before the cartridge application, and then determines the image forming condition used in image formation control, on the basis of a verification result. Thereafter, the image forming apparatus 100 executes the image formation control using the determined image forming condition and the cartridge authentication in parallel to each other, i.e., the image formation control and the cartridge authentication so that at least a part of each period of the image formation control and the cartridge authentication overlaps with each other. By this, it is possible to suppress an increase in time, required for the initial check, due to the cartridge authentication. In the following, description will be described further specifically.

(System Constitution)

Figure 2:
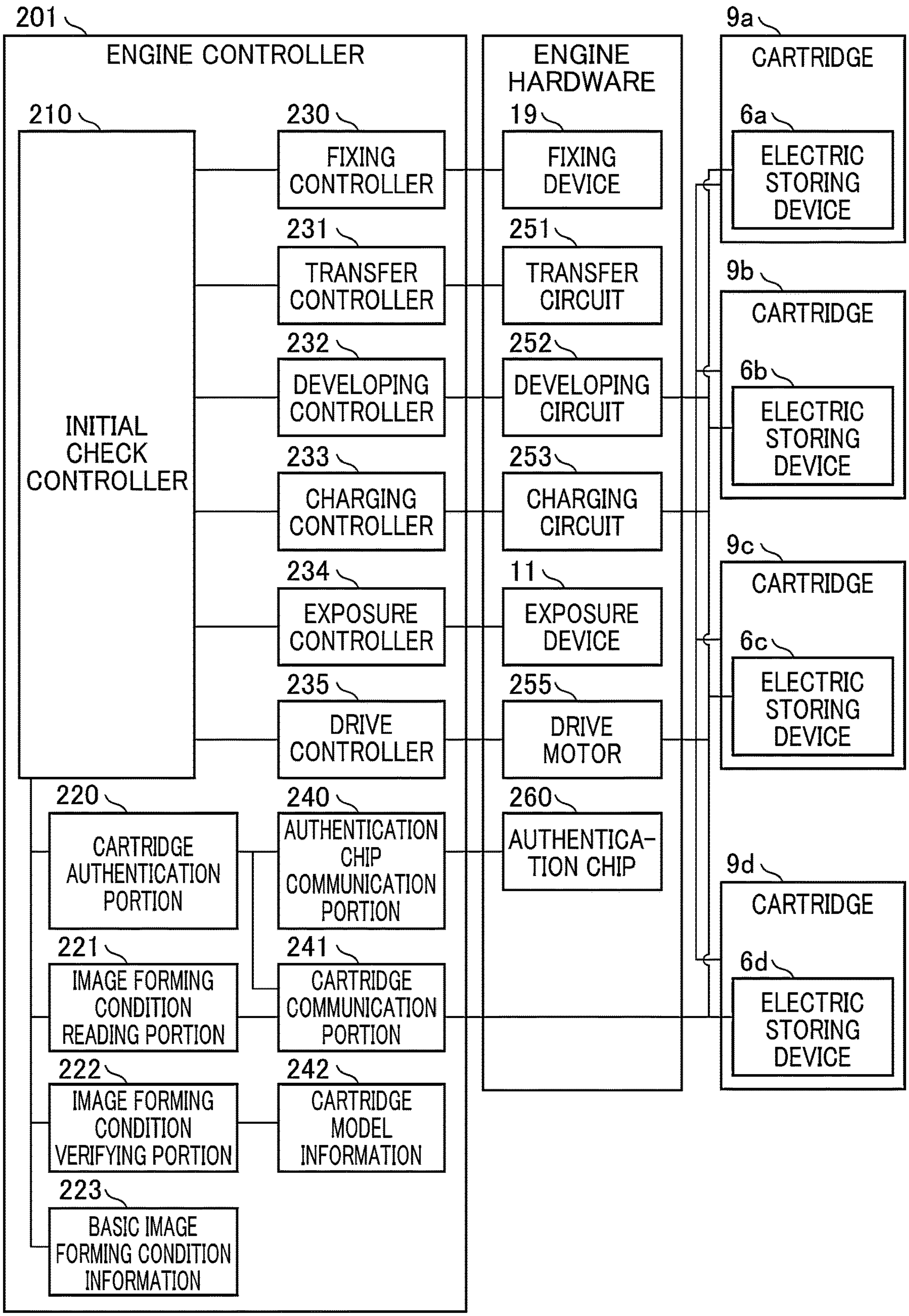
FIG. 2 is a block diagram showing a system constitution of the image forming apparatus of an embodiment 1.

FIG. 2 is a block diagram showing a system constitution of the image forming apparatus 100.

The image forming apparatus 100 includes the engine controller 201 which is a controller (control circuit) as a control means for controlling the respective portions of the image forming apparatus 100. The engine controller 201 is constituted by including a CPU, a ROM and a RAM as storing means, a non-volatile memory, an input/output portion (input-output circuit) as an input/output means, and the like. The engine controller 201 includes, as functional blocks, an initial check controller 210 as an initial check control means, a cartridge authentication portion 220 as a cartridge authenticating means, an image forming condition reading portion 221 as an image forming condition reading means, an image forming condition verifying portion 222 as an image forming condition verifying means, a fixing controller 230 as a fixing control means, a transfer controller 231 as a transfer control means, a developing controller 232 as a development control means, a charging controller 233 as a charging control means, an exposure controller 234 as an exposure control means, and a drive controller 235 as a drive control means. Each of these portions is realized by executing a program stored in the ROM by the CPU in the engine controller 201. Further, the engine controller 201 includes, as functional blocks, an authentication chip communication portion 240 and a cartridge communication portion 241. These portions are realized by operating the input/output portion in accordance with a program stored in the ROM by the CPU in the engine controller 201. Further, the engine controller 201 holds a basic image forming condition information 223 and cartridge model information 242. These pieces of information are stored in the ROM in the engine controller 201 (storing portions for those pieces of information are also referred to as a basic image forming condition information storing portion 223 and a cartridge model information storing portion 242, respectively). Further, the engine controller 201 is capable of communicating with an external device (not shown) such as a personal computer via an interface portion (not shown), and is capable of not only receiving an image signal and the like from the external device but also sending a signal for displaying the information on the external device, and the like signal.

The image forming apparatus 100 executes the initial check at the power source ON (during actuation) or at the cartridge door open/close. The engine controller 201 requests the initial check controller 210 to make the initial check. The initial check controller 210 executes a preparation operation for carrying out the printing in the cartridge authentication portion 220, the image forming condition reading portion 221, the image forming condition verifying portion 222, the fixing controller 230, the transfer controller 231, the developing controller 232, the charging controller 233, the exposure controller 234, and the drive controller 235, and shifts the state of the image forming apparatus 100 to a printable state. The cartridge authentication portion 220 communicates with an authentication chip 260 via the authentication chip communication portion 240. Further, the cartridge authentication portion 220 communicates with electric storing devices 6_a_, 6_b_, 6_c_, and 6_d_, provided to the cartridges 9_a_, 9_b_, 9_c_, and 9_d_, via the cartridge communication portion 241, and thus authenticates the cartridges 9_a_, 9_b_, 9_c_, and 9_d_ mounted to the image forming apparatus 100 in communication with the electric storing devices 6*a*, 6*b*, 6*c*, and 6*d* provided to the cartridges 9*a*, 9*b*, 9*c*, and 9*d* via the cartridge communication portion 241. The image forming condition reading portion 221 communicates with the electric storing devices 6*a*, 6*b*, 6*c*, and 6*d* via the cartridge communication portion 241, and thus reads the image forming conditions of the cartridges 9*a*, 9*b*, 9*c*, and 9*d*. The image forming condition verifying portion 222 verifies the image forming condition read by the image forming condition reading portion 221. The fixing controller 230 controls the fixing device 19. The transfer controller 231 controls a transfer circuit 251 constituted by including the primary transfer bias power sources 84*a*, 84*b*, 84*c*, and 84*d* and the secondary transfer bias power source 85. The developing controller 232 controls a developing circuit 252 constituted by including the developing bias power sources 21*a*, 21*b*, 21*c*, and 21*d*. The charging controller 233 controls a charging circuit 253 constituted by including the charging bias power sources 20*c*, 20*b*, 20*c*, and 20*d*. The exposure controller 234 controls the exposure device 11. The drive controller 235 controls a single or a plurality of drive motors 255 for driving the photosensitive drum 1, the developing roller 4, the intermediary transfer belt 80, and the like. The basic image forming condition information 223 is image forming condition information (second condition information) used in the case where image forming condition information (first condition information) is read from the electric storing devices 6*a*, 6*b*, 6*c*, and 6*d*. The cartridge model information 242 is model information (constituted by model number, for example) of the cartridges 9*a*, 9*b*, 9*c*, and 9*d*. Each of the controllers executes control designated from the initial check controller 210.

Here, the image forming condition is information on an operation setting of at least one of the charging means, the exposure means, the developing means, the transfer means, and the fixing means, for example. It is possible to cite setting of the charging voltage as the operation setting of the charging means, setting of exposure intensity as the operation setting of the exposure means, setting of the developing voltage as the operation setting of the developing means, setting of the transfer voltage at the operation setting of the transfer means, and setting of a fixing temperature as the operation setting of the fixing means.

(Constitution of Authentication Chip and Electric Storing Device)

Part (a) of FIG. 3 is a block diagram showing an internal constitution of the authentication chip 260 in this embodiment. Further, part (b) of FIG. 3 is a block diagram showing an internal constitution of each of the electric storing devices 6*a*, 6*b*, 6*c*, and 6*d* having a function-to-be-authenticated.

First, with reference to part (a) of FIG. 3, when the authentication chip 260 receives a command (command data) from the authentication chip communication portion 240, the authentication chip 260 returns, to the authentication chip communication portion 240, response data as response of the command. An input/output portion 301 of the authentication chip 260 performs transmission and reception of command/response data between itself and the authentication chip communication portion 240. A microcomputer (micro controller) 302 of the authentication chip 260 executes internal processing in accordance with the command from the authentication chip communication portion 240. Incidentally, at that time, the microcomputer 302 of the authentication chip 260 stores temporary data in a volatile memory 303 of the authentication chip 260. An encoder 304 of the authentication chip 260 executes cryptographic calculation in the application processing in accordance with an instruction of the microcomputer 302 of the authentication chip 260. The non-volatile memory 305 of the authentication chip 260 holds a cryptographic key used in the cryptographic calculation and data necessary for the authentication processing. The authentication chip 260 constitutes a calculating portion for calculating an authentication value.

Next, with reference to part (b) of FIG. 3, the electric storing devices 6*a*, 6*b*, 6*c*, and 6*d* will be described. An input/output portion 311 of each of the electric storing devices 6*a*, 6*b*, 6*c*, and 6*d* performs transmission and reception of command/response data between itself and the cartridge communication portion 241. A microcomputer 312 of each of the electric storing devices 6*a*, 6*b*, 6*c*, and 6*d* executes internal processing in accordance with a command from the cartridge communication portion 241. Incidentally, at that time, the microcomputer of each of the electric storing devices 6*a*, 6*b*, 6*c*, and 6*d* stores temporary data in a volatile memory 313 of each of the electric storing devices 6*a*, 6*b*, 6*c*, and 6*d*. An encoder 314 of each of the electric storing devices 6*a*, 6*b*, 6*c*, and 6*d* executes cryptographic calculation in the authentication processing in accordance with an instruction of the microcomputer 312. Incidentally, the encoder 304 of the authentication chip 260 and the encoder 314 of each of the electric storing devices 6*a*, 6*b*, 6*c*, and 6*d* perform an encryption operation by the same algorithm. A non-volatile memory 315 of each of the electric storing devices 6*a*, 6*b*, 6*c*, and 6*d* holds a cryptographic key used in the cryptographic calculation and data necessary for the authentication processing. The cartridge authentication portion 220 transmits the commands the authentication chip 260 and the electric storing devices 6*a*, 6*b*, 6*c*, and 6*d*. The authentication chip 260 and the electric storing devices 6*a*, 6*b*, 6*c*, and 6*d* perform processing in accordance with the commands, and transmit response data to the authentication chip communication portion 240 and the cartridge communication portion 241. The cartridge authentication portion 220 acquires data transmitted to the authentication chip communication portion 240 and the cartridge communication portion 241.

Further, the non-volatile memory 315 of each of the electric storing devices 6*a*, 6*b*, 6*c*, and 6*d* also holds an image forming condition 320 depending on each of the electric storing devices 6*a*, 6*b*, 6*c*, and 6*d*. The image forming condition reading portion 221 transmits a data reading command to each of the electric storing devices 6*a*, 6*b*, 6*c*, and 6*d*. Each of the electric storing devices 6*a*, 6*b*, 6*c*, and 6*d* reads the image forming condition 320 from the non-volatile memory 315 thereof, and transmits, as response data, the read image forming condition 320 to the cartridge communication portion 241. The image forming condition reading portion 221 acquires the image forming condition 320 transmitted to the cartridge communication portion 241. The image forming condition 320 includes the model information 321 for verifying the image forming condition. The model information 321 is for verifying whether or not the image forming apparatus is appropriate when the image forming apparatus 100 acquires the image forming condition 320. The non-volatile memory 315 of the electric storing device 6 constitutes a storing portion for the first condition information, the model information, and the like which are image forming condition information. Further, a portion-to-be-authenticated for realizing the function-to-be-authenticated is constituted by the microcomputer 312, the encoder 314, and the like of the electric storing device.

(Authentication Processing)

FIG. 4 is a sequence chart of the authentication processing. In FIG. 4, signals starting from a character "C" show commands, and signals starting from a character "R" show responses to the commands. Further, a character "OP" shows processing (operation) performed by a corresponding device or chip.

In OP401, the cartridge authentication portion 220 generates random number data as challenge data.

In C401, the cartridge authentication portion 220 requests generation of authentication data of the random number data to the authentication chip 260.

In OP402, the authentication chip 260 generates the authentication data from the random number data with use of the encoder 304 and a common key.

In R401, the authentication chip 260 returns the authentication data.

In C402, the cartridge authentication portion 220 sends the random number data and the authentication data to the electric storing device 6 which is a communication object.

In OP403, the electric storing device 6 generates cartridge verifying data from the random number data with use of the encoder 314 and a common key. The common key is used, and the encoder 304 of the authentication chip 260 and the encoder 314 of the electric storing device 6 perform the same operation, so that the authentication data and the cartridge verifying data coincide with each other. Then, the electric storing device 6 generates data-to-be-authenticated from the random number data with use of the encoder 314 and the common key.

In R402, the electric storing device 6 returns the data-to-be-authenticated.

In C403, the cartridge authentication portion 220 sends the random number data and the data-to-be-authenticated to the authentication chip 260.

In OP404, the authentication chip 260 generates authentication chip verifying data from the random number data with use of the encoder 304 and an authentication key. A common key is used, and the encoder 304 of the authentication chip 260 and the encoder 314 of the electric storing device 6 perform the same operation, so that the data-to-be-authenticated and the authentication chip verifying data coincide with each other.

In R403, the authentication chip 260 returns a verification result as whether or not the data-to-be-authenticated and the authentication chip verifying data coincide with each other.

In OP405, the cartridge authentication portion 220 discriminates that the authentication is successful when the verification result from the authentication chip 260 shows the above-described data in R403 coincide with each other, and discriminates that the authentication is unsuccessful when the above-described data in R403 do not coincide with each other.

Incidentally, the order of the sequence of the authentication processing shown in FIG. 4 is an example. For example, it is also possible to repetitively execute processing similar to the above-described sequence. The present invention does not limit the order of the sequence of the authentication processing to the order of the sequence of the authentication processing shown in FIG. 4.

(Conventional Initial Check)

For comparison with this embodiment, first, a conventional initial check will be described. Incidentally, also, as regards a conventional image forming apparatus, elements having the same or corresponding functions or constitutions as those in this embodiment will be described by adding the same reference numerals or symbols as those in this embodiment.

FIG. 5 is a timing chart of the conventional initial check.

Before a start (T501) of the initial check, the cartridge authentication portion 220 is in an unauthenticated state. Further, before the start (T501) of the initial check, the image forming condition reading portion 221 is in a state before reading. The initial check controller 210 provides an instruction of authentication to the cartridge authentication portion 220 at a start timing (T501) of the initial check. The cartridge authentication portion 220 executes cartridge authentication by the method described with reference to FIG. 4 or the like method. After completion of the cartridge authentication (T502), the initial check controller 210 provides an instruction of reading of the image forming condition 320 to the image forming condition reading portion 221. After completion of the reading of the image forming condition 320 (T503), the initial check controller 211 executes initial check image formation control 500. In the initial check image formation control 500, the following is executed. First, the initial check controller 210 provides an instruction of a drive start to the drive controller 235. At a timing when an operation of the drive motor 255 is stabilized by the drive controller 235 (T510), the initial check controller 210 provides an instruction of a start of the control to the charging controller 233, the developing controller 232, the exposure controller 234, the fixing controller 230, and the transfer controller 231. The initial check controller 210 provides an instruction of a stop of the control to the respective controllers after completion of print preparation at the respective controllers consisting of the drive controller 235, the charging controller 233, the developing controller 232, the exposure controller 234, the fixing controller 230, and the transfer controller 231 (T504).

FIG. 6 is a flowchart of the conventional initial check.

The image forming apparatus 100 executes the initial check, that as a trigger, that the power source switch 120 of the image forming apparatus 100 is turned on (ON) or that the cartridge door 130 of the image forming apparatus 100 is opened.

The initial check controller 210 executes the cartridge authentication by the cartridge authentication portion 220 after the start of the initial check (S601). The cartridge authentication portion 220 executes the cartridge authentication by the method described with reference to FIG. 4 or by the like method. The initial check controller 210 waits for completion of the authentication to all the cartridges 9*a*, 9*b*, 9*c*, and 9*d* (S602). The initial check controller 210 executes reading of the image forming condition after the completion of the authentication to all the cartridges 9*a*, 9*b*, 9*c*, and 9*d* (S603). As described with reference to part (b) of FIG. 3, the image forming condition reading portion 221 transmits a data reading command to the electric storing devices 6*a*, 6*b*, 6*c*, and 6*d* via the cartridge communication portion 241. The image forming condition reading portion 221 receives response data from the electric storing devices 6*a*, 6*b*, 6*c*, and 6*d* through the cartridge communication portion 241. The image forming condition reading portion 221 acquires the image forming condition 320 by repeating this operation. The initial check controller 210 waits until reading of the image forming condition 320 of all the cartridges 9*a*, 9*b*, 9*c*, and 9*d* is completed (S604).

The initial check controller 210 determines the image forming condition after completion of the image forming condition (S605). The determined image forming condition is held in the RAM of the engine controller 201. In this embodiment, on the basis of an authentication result and the model information 321 included in the image forming condition 320, whether to use the image forming condition 320 or to use the basic image forming condition information 223 is discriminated, so that the image forming condition is determined. As an example, it is possible to cite that the image forming condition received from the electric storing devices 6*a*, 6*b*, 6*c*, and 6*d* is used in the case where the cartridge authentication is successful, and that the basic image forming condition information 223 is used in the case where the cartridge authentication is unsuccessful.

After the image forming condition is determined (S605), the initial check controller 210 notifies the user of the cartridge authentication result (S606). Then, the initial check controller 210 executes the initial check image formation control 500 (S607), and completes the initial check when the initial check image formation control 500 is completed.

(Initial Check of this Embodiment)

FIG. 7 is a timing chart of the initial check in this embodiment. In this embodiment, different from the conventional initial check shown in FIG. 5, after the image forming condition of the cartridges 9*a*, 9*b*, 9*c*, and 9*d* is read, the cartridge authentication and the initial check image formation control are executed in parallel.

Before a start (T701) of the initial check, the cartridge authentication portion 220 is in an unauthenticated state. Further, before the start (T701) of the initial check, the image forming condition reading portion 221 is in a state before reading. At a start timing of the initial check (T701), the initial check controller 210 provides an instruction of reading of the image forming condition 320 to the image forming condition reading portion 221. When the reading of the image forming condition 320 is completed (T702), the initial check controller 210 not only starts the initial check image formation control 500 but also starts the cartridge authentication by the cartridge authentication portion 220. The cartridge authentication by the cartridge authentication portion 220 typically ends during execution of the initial check image formation control 500 (T703). When the initial check image formation control 500 and the cartridge authentication are completed, the initial check controller 210 provides an instruction of a stop of the control to each of the controllers (T704). Incidentally, the initial check image formation control 500 in this embodiment is the same as the initial check image formation control 500 shown in FIG. 5.

Incidentally, the order of a sequence shown in FIG. 7 is an example. There is a possibility that the initial check image formation control 500 cannot be started immediately after acquisition of the image forming condition in some cases. For example, there is a case where there is a start condition of the initial check image formation control 500 other than the acquisition of the image forming condition. In that case, the initial check image formation control 500 is started after the start condition is satisfied. Further, also, as regards the cartridge authentication, there is a possibility that the cartridge authentication cannot be started immediately after acquisition of the image forming condition in some cases. For example, it is possible to cite the case where cartridge authentication preparation processing is needed, the case where a communication path with the authentication chip 260 is used for another control means, and the like case. In these cases, the cartridge authentication portion 220 cannot start the cartridge authentication immediately after the acquisition of the image forming condition, and therefore starts the cartridge authentication as soon as the cartridge authentication can be started. Further, a timing when the cartridge authentication is ended and a timing when the initial check image formation control 500 is ended depend on a time required for the cartridge authentication and a time required for stabilizing the driving portion, respectively, and therefore, the timing varies in some cases. Parts (a) and (b) of FIG. 8 are flowcharts of the initial check in this embodiment. Part (a) of FIG. 8 is the flowchart of entirety of the initial check. Part (b) of FIG. 8 is the flowchart of processing of S803 (determination of the image forming condition in part (a)) of FIG. 8.

In this embodiment, as described with reference to FIG. 7, after the image forming condition of the cartridges 9*a*, 9*b*, 9*c*, and 9*d* are read, the cartridge authentication and the initial check image formation control are executed in parallel. Further, in this embodiment, verification of the image forming condition is executed after the reading of the image forming condition, so that checking that the read image forming condition is appropriate is made. Further, in this embodiment, an authentication result in the cartridge authentication is notified.

The image forming apparatus 100 executes the initial check, as a trigger, that the power source switch 120 of the image forming apparatus 100 is turned on (ON) or that the cartridge door 130 of the image forming apparatus 100 is opened.

As shown in part (a) of FIG. 8, the initial check controller 210 executes the reading of the image forming condition after the start of the initial check (S801). The reading of the image forming condition is executed by the method described with reference to part (a) of FIG. 3 or FIG. 6. The initial check controller 210 waits until reading of the image forming condition 320 of all the cartridges 9*a*, 9*b*, 9*c*, and 9*d* is completed (S802). The initial check controller 210 determines the image forming condition after completion of the image forming condition (S803).

As shown in part (b) of FIG. 8, in the processing of S803 (determination of the image forming condition) in part (a) of FIG. 8, the initial check controller 210 executes verification of the read image forming condition 320 by the image forming condition verifying portion 222. The image forming condition verifying portion 222 compares the cartridge model information 242 held by the engine controller 201 and the model information 321 included in the image forming condition 320 read from the cartridges 9*a*, 9*b*, 9*c*, and 9*d* with each other (S810), and when these pieces of the model information are the same, the verification is successful (the read image forming condition is usable), and when these pieces of the model information are not the same, the verification is unsuccessful (the read image forming condition is unusable). Then, the initial check controller 210 selects use of the image forming condition 320 read from the cartridges 9*a*, 9*b*, 9*c*, and 9*d* when the verification is successful in the image forming condition verifying portion 222 (S811), and selects use of the basis image forming condition 223 held by the engine controller 201 when the verification is unsuccessful (S812). The determined image forming condition is held in the RAM of the engine controller 201.

As shown in part (a) of FIG. 8, after the image forming condition is determined (S803), the initial check controller 210 executes the cartridge authentication in the cartridge authentication portion 220 (S804).

The cartridge authentication portion 220 executes the cartridge authentication by the method described with reference to FIG. 4 or the like method. The initial check controller 210 waits until verification to all the cartridges 9*a*, 9*b*, 9*c*, and 9*d* (S805). After the verification to all the cartridges 9*a*, 9*b*, 9*c*, and 9*d* is completed, the initial check controller 210 notifies the user of a reading result of the image forming condition and an authentication result (S806). In this embodiment, in the case where the image forming condition verifying portion 222 fails in verification during the reading of the image forming condition, the initial check controller 210 notifies the user of failure in verification of image forming condition. Further, in this embodiment, in the case where the cartridge authentication fails, the initial check controller 210 notifies the user of failure in cartridge authentication. By this, the user is capable of checking whether or not the cartridge 9 assumed by the user is mounted to the image forming apparatus 100. This notification is made by display of a message in the operating portion 140. Further, this notification may be information simply indicating that the image forming condition cannot be read appropriately or that the cartridge 9 cannot be authenticated, or may also include information prompting the use to check the cartridge 9 or information notifying the user that there is a possibility of a lowering in image quality. Incidentally, this notification is not limited to execution by the operating portion 140, but may also be performed in an external device by transmitting, to the external device, information (signal) for making similar notification. Further, this notification is not limited to execution by display, but may also be made by generation of sound (message, alarm) by a sound-generating portion, generation of light (lighting, blinking) by a light-emitting portion, and the like.

Further, as shown in part (a) of FIG. 8, the initial check controller 210 executes initial check image formation control in parallel to the cartridge authentication (S804) (S808).

Further, as shown in part (a) of FIG. 8, the initial check controller 210 waits completion of the cartridge authentication (S804) and the initial check image formation control (S808) (S807), and then completes the initial check.

Incidentally, the order of a sequence shown in FIG. 8 is an example. For example, the notification of the reading result of the image forming condition can be made as soon as the reading of the image forming condition is ended. Further, a determining method of the image forming condition is not limited to the method described in this embodiment. Any method is applicable when the method verifies the read image forming condition (discriminates whether or not the read image forming condition is suitable for the image forming apparatus 100 or the cartridge 9).

Thus, in this embodiment, to the image forming apparatus 100, a device (electric storing device) 6 including the storing portion (non-volatile memory) 315 and the portion-to-be-authenticated (microcomputer 312, encoder 314, and the like) is detachably mountable, and the image forming apparatus 100 forms the image by using the mounted cartridge 9. Further, in this embodiment, this image forming apparatus 100 includes the controller (initial check controller) 210 for executing image formation control by using the image forming condition information; the acquiring portion (image forming condition reading portion) 221 for acquiring first condition information 320 which is image forming condition information from the storing portion 315 in communication with the device 6; the verifying portion (image forming condition verifying portion) 222 for verifying the first condition information acquired from the storing portion 315 by the acquiring portion 221; the second condition information storing portion (basic image forming condition information storing portion) 223 in which second condition information which is image forming condition information is stored; and authenticating portion (cartridge authentication portion) 220 for executing authentication processing for authenticate the cartridge 9 in communication with the device 6. At least a part of the image formation control, using the first condition information or the second condition information selected on the basis of a verification result by the verifying portion 222, by the controller 210 and at least a part of the authentication processing by the authentication portion 220 are executed in parallel. In this embodiment, the controller 210 executes the image formation control by using the first condition information in a case where the first condition information is discriminated as being usable by the verifying portion 222, and executes the image formation control by using the second condition information in a case where the first condition information is discriminated as being unusable by the verifying portion 222. Further, in this embodiment, the image forming apparatus 100 includes the model information storing portion (cartridge model information storing portion) 242 in which model information is stored, and the verifying portion 222 discriminates that the first condition information is usable in a case where model information acquired from the storing portion 315 and the model information stored in the model information storing portion 242 coincide with each other, and discriminates that the first information is unusable in a case where the model information acquired from the model information stored in the model information storing portion do not coincide with each other. Further, in this embodiment, the image forming apparatus 100 includes a calculating portion (authentication chip) 260 for calculating an authentication value by using a common key, and on the basis of the authentication value calculated by the calculating portion 260 and an authentication value acquired from the portions-to-be-authenticated 312 and 314 and calculated with use of a common key by the portions-to-be-authenticated 312 and 314, the authentication portion 220 authenticates the cartridge 9 in the case where the authentication value acquired from the portions-to-be-authenticated 312 and 314 is correct. Further, in this embodiment, the image formation control is controlled for putting the image forming apparatus 100 in a state in which the image forming apparatus 100 is capable of forming the image on the basis of the image information. Further, in this embodiment, the image forming condition is information on operation setting of at least one of the charging means, the exposure means, the developing means, the transfer means, and the fixing means. Further, in this embodiment, to the image forming apparatus 100, the cartridge 9 including at least a part of the developing means is detachably mountable.

As described above, in this embodiment, the image forming apparatus 100 acquires the image forming condition during the initial check before the cartridge authentication. Further, in this embodiment, the image forming apparatus 100 verifies the acquired image forming condition and discriminates whether or not the image forming condition is an appropriate image forming condition, and then determines an image forming condition on the basis of the discrimination. Thereafter, the image forming apparatus 100 executes the cartridge authentication and the initial check image formation control in parallel. By this according to a time required for the initial check can be made shorter than that in a conventional constitution.

Incidentally, as described with reference to FIG. 7, the cartridge authentication and the initial check image formation control are not necessarily required to be started at the same time. For example, in the case where only the cartridge 9*a* is a new cartridge, it would be considered that the image forming apparatus waits for the start of the initial check image formation control until the authentication of the cartridge 9*a* is completed, and then executes the cartridge authentication and the initial check image formation control in parallel for other cartridges 9*b*, 9*c*, and 9*d*.

Further, application of this embodiment is not limited to only the initial check. There is control such that when a job (a series of operations for forming and outputting image(s) on a single or plurality of recording materials by a single start instruction) is executed, the image forming condition is acquired after the cartridge authentication, and the image formation control (pre-rotation step and the like) is carried out by using the acquired image forming condition. For such control, in accordance with this embodiment, when the job is executed, it is possible to execute the image formation control (pre-rotation step and the like) and the cartridge authentication after the image forming condition is read. Further, the authenticating method is not limited to the authenticating method described in this embodiment, but any authenticating method can be applied.

Embodiment 2

Next, another embodiment of the present invention will be described. Basic constitution and operation of an image forming apparatus of an embodiment 2 are the same as those of the image forming apparatus of the embodiment 1. Accordingly, in the image forming apparatus of the embodiment 2, as regards elements having the same or corresponding functions and constitutions as those in the image forming apparatus of the embodiment 1, reference numerals or symbols which are the same as those in the embodiment 1 are added and detailed description thereof will be omitted.

In the embodiment 1, during the initial check, the image forming condition was always read from the cartridge 9*a*. However, in the case where the image forming condition has already been read from the cartridge 9 and discrimination that the cartridge 9 is not exchanged can be made, there is no need to newly read the image forming condition from the cartridge 9. Further, in the embodiment 1, description was made on assumption that the power sources can be arbitrarily turned on for the plurality of the electric storing devices 6. However, in an image forming apparatus 100 to which the plurality of cartridges 9 are mountable, for the purpose of cost reduction or the like, it would be considered that the power sources cannot be turned on at the same time for the plurality of the electric storing devices 6. In this embodiment, the case where discrimination as to whether or not the cartridge 9 is exchanged (cartridge exchange discrimination) is made and there is a need to communicate with each of the plurality of the electric storing devices 6 will be described.

FIG. 9 is a block diagram showing a system constitution of the image forming apparatus 100 of this embodiment. In this embodiment, the engine controller 201 includes, as functional blocks, a cartridge exchange discriminating portion 900 as a cartridge exchange discriminating means and a power source switch controller 910 as a power source switch control means. These portions are realized by executing a program, stored in the ROM, by the CPU of the engine controller 201. Further, in this embodiment, the engine controller 201 includes a storing portion 911 as a storing means for storing information necessary to discriminate cartridge exchange. This portion is realized by the non-volatile memory of the engine controller 201.

The cartridge exchange discriminating portion 900 discriminates whether or not either of the cartridges 9*a*, 9*b*, 9*c*, and 9*d* is exchanged in the case where the cartridge door 130 is opened and closed after the power source of the image forming apparatus 100 is turned on (after the image forming apparatus 100 is actuated). The cartridge exchange discriminating portion 900 accesses the electric storing devices 6*a*, 6*b*, 6*c*, and 6*d* via the cartridge communication portion 241 and acquires information necessary to discriminate the cartridge exchange. The cartridge exchange discriminating portion 900 causes the storing portion 911 to store the information necessary to discriminate the cartridge exchange. When of the plurality of electric storing devices 6*a*, 6*b*, 6*c*, and 6*d*, the electric storing device 6 to be actuated is instructed, the power source switch controller 910 operates a power source switch signal 920 which is an electric signal as a power source switching means, and thus actuates an objective electric storing device 6. Other points of the system constitution shown in FIG. 9 are the same as those described with reference to FIG. 2.

FIG. 10 is a block diagram showing an internal constitution of the electric storing devices 6*a*, 6*b*, 6*c*, and 6*d* each having a function-to-be-authenticated in this embodiment.

In this embodiment, an image forming condition 320 includes an ID information (individual identification information) 1000. When the microcomputer 312 of each of the electric storing devices 6*a*, 6*b*, 6*c*, and 6*d* receives in ID acquisition command from the input/output portion 311 of each of the electric storing devices 6*a*, 6*b*, 6*c*, and 6*d*, the microcomputer 312 reads the ID information 1000 from the non-volatile memory 315 of each of the electric storing devices 6*a*, 6*b*, 6*c*, and 6*d*. The microcomputer 312 of each of the electric storing devices 6*a*, 6*b*, 6*c*, and 6*d* transmits, as response data of the ID acquisition command, the read ID information to the input/output portion 311 of each of the electric storing devices 6*a*, 6*b*, 6*c*, and 6*d*. Each of the electric storing devices 6*a*, 6*b*, 6*c*, and 6*d* transmits the ID information 1000, transmitted to the input/output portion 311, to the cartridge communication portion 241. The cartridge exchange discriminating portion 900 acquires the ID information 1000 transmitted to the cartridge communication portion 241.

FIG. 11 is a flowchart of cartridge exchange discrimination in this embodiment. In this case, the cartridge 9*a* will be described as an example. Also, as regards other cartridges 9*b*, 9*c*, and 9*d*, the cartridge exchange discrimination can be made by the same method.

The cartridge exchange discriminating portion 900 reads the ID information 1000 of the electric storing device 6*a* (S1101). The cartridge exchange discriminating portion 900 discriminates whether or not the ID information is the same as the last ID information 1000 after completion of the reading of the ID information of the electric storing device 6*a* (S1102). The last ID information 1000 is stored in the storing portion 910. The cartridge exchange discriminating portion 900 discriminates that the cartridge 9*a* is exchanged in the case where the last ID information 1000 and the ID information 1000 acquired this time and different from each other (S1103), and then causes the storing portion 910 to store the ID information 1000 acquired this time (S1104). The cartridge exchange discriminating portion 900 discriminates that the cartridge 9*a* is not exchanged in the case where the last ID information 1000 and the ID information 1000 acquired this time are the same (S1105). Further, also, in the case where the last ID information 1000 is not stored in the storing portion 910, the cartridge exchange discriminating portion 900 discriminates that the cartridge 9*a* is exchanged.

FIG. 12 is a timing chart of an initial check in this embodiment. A sequence shown in FIG. 12 is different from the sequence shown in FIG. 7 in that the cartridge exchange discrimination is added and that the cartridge exchange discriminating portion 900 accesses the electric storing devices 6*a*, 6*b*, 6*c*, and 6*d* one by one. Further, FIG. 12 shows, as an example, the case where when the cartridge door 130 is opened after execution of the initial check preceding this initial check, the cartridges 9*a*, 9*b*, 9*c* are exchanged but the cartridge 9*d* is not exchanged. For that reason, as regards the cartridges 9*a*, 9*b*, and 9*c*, at the time of a start of this initial check, the image formation information 320 is before reading. On the other hand, as regards the cartridge 9*d*, at the time of the start of this initial check, the image formation information 320 is after reading.

When the cartridge door 130 is closed, the image forming apparatus 100 causes the initial check controller 210 to start the initial check. After the initial check is started, the initial check controller 210 causes the cartridge exchange discriminating portion 900 to execute the cartridge exchange discrimination (T1201). In this embodiment, the cartridge exchange discriminating portion 900 executes the cartridge exchange discrimination in the order of the cartridges 9*a*, 9*b*, 9*c*, and 9*d*.

The cartridge exchange discriminating portion 900 provides an instruction to the power source switch controller 910 for turning on the power source of the electric storing device 6*a*. The cartridge exchange discriminating portion 900 executes the cartridge exchange discrimination when actuation of the electric storing device 6*a* by the power source switch controller 910 is completed. When the cartridge exchange discriminating portion 900 discriminates that the cartridge is exchanged, the initial check controller 210 causes the image forming condition reading portion 221 to execute reading of the image forming condition (T1202). When the reading of the image forming condition from the electric storing device 6*a* is completed (T1203), the initial check controller 210 executes the cartridge exchange discrimination of the cartridge 9*a*. In this embodiment, as regards the cartridges 9*b* and 9*c*, processing similar to the processing of the cartridge 9*a* is performed (T1203 to T1207). When the reading of the image forming condition of the cartridge 9*c* is completed (T1207), the initial check controller 210 executes the cartridge exchange discrimination for the cartridge 9*d*.

That is, the cartridge exchange discriminating portion 900 turns on the power source of the electric storing device 6*d* and executes the cartridge exchange discrimination. In this embodiment, the initial check controller 210 causes the cartridge exchange discriminating portion 900 to discriminate that the cartridge 9*d* is not exchanged. For that reason, the initial check controller 210 omits the image forming condition reading by the image forming condition reading portion 221 (T1208).

Thereafter, the initial check controller 210 determines the image forming condition used in the initial check image formation control 500, and then executes the cartridge authentication by the cartridge authentication portion 220 and the initial check image formation control 500 is parallel. In this embodiment, the cartridge authentication portion 220 executes the cartridge authentication in the order of the cartridges 9*a*, 9*b*, 9*c*, and 9*d* (T1208 to T1212). At that time, the cartridge authentication portion 220 provides an instruction to the power source switch controller 910 for actuating the electric storing device 6 for the objective cartridge 9, and executes the authentication after the actuation of the electric storing device 6 is completed. The initial check controller 210 ends the initial check when the authentication to all the cartridges 9*a*, 9*b*, 9*c*, and 9*d* and the initial check image formation control 500 are completed (T1213).

FIG. 13 is a flowchart of the initial check in this embodiment. In FIG. 13, processes similar to those of FIG. 8 will be appropriately omitted from description by adding the same step numbers as those in FIG. 8. Incidentally, in this embodiment, similarly as in the case of FIG. 12, the case where when the cartridge door 130 is opened after the execution of the initial check preceding of this (present) initial check, the cartridges 9*a*, 9*b*, and 9*c* are exchanged but the cartridge 9*d* is not exchanged will be described as an example.

First, the initial check controller 210 selects the cartridge 9 (S1301). In this embodiment, the cartridges 9 are selected in the order of the cartridges 9*a*, 9*b*, 9*c*, and 9*d*. The initial check controller 210 causes the cartridge exchange discriminating portion 900 to execute the cartridge exchange discrimination for the selected cartridge 9 (S1302). As described with reference to FIG. 12, the cartridge exchange discriminating portion 900 accesses the objective cartridge 9 after the power source of the objective electric storing device 6 is turned on. When the cartridge exchange discrimination is completed, the initial check controller 210 discriminates whether or not the cartridge 9 is exchanged, from a result of the cartridge exchange discrimination (S1303). In the case where discrimination that the cartridge 9 is exchanged is made by the cartridge exchange discriminating portion 900, the initial check controller 210 executes reading of the image forming condition (S1304). The cartridge exchange discriminating portion 900 discriminates that the cartridge 9 is exchanged also in the case where the image forming condition 320 is not read from the cartridge 9 even once (in the case where the ID information 1000 is not stored in the storing portion 910). Further, in the case where discrimination that the cartridge 9*s* is not exchanged is made by the cartridge exchange discriminating portion 900, the initial check controller 210 determines the image forming condition without newly reading the image forming condition (S803). In this sequence, the cartridges 9*a*, 9*b*, and 9*c* are exchanged, and therefore, the initial check controller 210 executes the reading of the image forming condition from the cartridges 9*a*, 9*b*, and 9*c*. On the other hand, the cartridge 9*d* is not exchanged, and therefore, the initial check controller 210 does not execute the reading of the image forming condition from the cartridge 9*d*. Determination processing of the image forming condition (S803) is the same as the determination processing described with reference to FIG. 8.

When the reading of the image forming condition from all the cartridges 9 is completed (S1305), the initial check controller 210 executes the cartridge authentication and the initial check image formation control 500 (S808) in parallel as described with reference to FIG. 8. For the cartridge authentication, the objective cartridge 9 is selected in the order of the cartridges 9*a*, 9*b*, 9*c*, and 9*d* (S1306), and then, authentication to the selected cartridge 9 is executed (S1307). The cartridge authentication portion 220 causes the cartridge exchange discriminating portion 900 to actuate the electric storing device 6 for the cartridge 9 which is an authentication object, and then makes authentication. When the cartridge authentication to all the cartridges 9*a*, 9*b*, 9*c* and 9*d* is executed (S1308), the initial check controller 210 notifies the user of an image forming condition reading result and an authentication result (S806). Notification of the image forming condition reading result and the authentication result is the same as the notification described with reference to FIG. 8. Thereafter, the initial check controller 210 waits for completion of the authentication to all the cartridges 9*a*, 9*b*, 9*c*, and 9*d* and the initial check image formation control (S807), and the completes the initial check. 9 which is an authentication object, and then makes authentication. When the cartridge authentication to all the cartridges 9*a*, 9*b*, 9*c* and 9*d* is executed (S1308), the initial check controller 210 notifies the user of an image forming condition reading result and an authentication result (S806). Notification of the image forming condition reading result and the authentication result is the same as the notification described with reference to FIG. 8. Thereafter, the initial check controller 210 waits for completion of the authentication to all the cartridges 9*a*, 9*b*, 9*c*, and 9*d* and the initial check image formation control (S807), and the completes the initial check.

Thus, in this embodiment, the image forming apparatus 100 includes the exchange discriminating portion (cartridge exchange discriminating portion) 900 for discriminating whether or not the cartridge 9 is exchanged. In the case where first condition information is acquired from the storing portion 315 before this (present) discrimination by the exchange discriminating portion 900 and discrimination that the cartridge 9 is not exchanged is made by the present discrimination by the exchange discriminating portion 900, at least a part of image formation control by the controller 210 using the first condition information acquired from the storing portion 315 before the present discrimination by the exchange discriminating portion 900 and at least a part of the above-described authentication processing by the authentication portion 220 are executed in parallel. In this embodiment, the image forming apparatus 100 includes an identification information storing portion 911 for storing cartridge identification information (ID information) 1000 for identifying the cartridge 9 acquired from the storing portion 315, and the exchange discriminating portion 900 discriminates that the cartridge 9 is not exchanged, in the case where the cartridge identification information 1000 acquired from the storing portion 315 of the cartridge 9 mounted to the image forming apparatus 100 and cartridge identification information stored in the identification information storing portion 911 coincide with each other, and discriminates that the cartridge 9 is exchanged, in the case where the above-described cartridge identification information 1000 and the above-described cartridge identification information do not coincide with each other.

As described above, in this embodiment, the image forming apparatus 100 discriminates whether or not the image forming condition is acquired during the initial check and acquires the image forming condition for only the cartridge 9 necessary to acquire the image forming condition. When the image forming condition has already been acquired or when the objective cartridge is not a cartridge 9 which is not exchanged, acquisition of the image forming condition is omitted. Thereafter, the cartridge authentication and the initial check image formation control are executed in parallel. By this according to this embodiment, a time required for the initial check can be shortened than in the conventional constitution.

Incidentally, the discrimination as to whether or not the image forming condition is acquired and the cartridge exchange discrimination are not limited to the methods in this embodiment, but any method may be used. As regards the cartridge exchange discrimination, for example, the following method may be used. The image forming apparatus 100 is provided with a storing portion for storing peculiar information (individual identification information) of the image forming apparatus 100. Further, in the electric storing devices 6*a*, 6*b*, 6*c*, and 6*d* of the cartridges 9*a*, 9*b*, 9*c*, and 9*d* mounted to the image forming apparatus 100, the peculiar information of the image forming apparatus 100 is stored by a writing portion.

During the cartridge exchange discrimination, the peculiar information of the image forming apparatus 100 stored in the electric storing devices 6*a*, 6*b*, 6*c*, and 6*d* is acquired and compared with peculiar information stored in the storing portion of the image forming apparatus 100. By this, depending on whether or not these pieces of information coincide with each other, it is possible to discriminate whether or not the cartridge 9 is exchanged. Both this discriminating method and the above-described discriminating method in this embodiment may be used, and in that case, it is possible to discriminate that the objective cartridge is exchanged in the case where discrimination that the cartridge is exchanged is made by either of the above-described discriminating methods and to discriminate that the objective cartridge is not exchanged in the case where discrimination that the cartridge is not exchanged is made by either of the above-described discriminating methods. Thus, the image forming apparatus 100 may include an apparatus identification information storing portion in which apparatus identification information for identifying the image forming apparatus 100 is stored and a writing portion for causing the storing portion 315, of the cartridge 9 mounted to the image forming apparatus 100, to store the apparatus identification information. In this case, the exchange discriminating portion 900 can discriminate that the cartridge 9 is not exchanged in the case where the apparatus identification information acquired form the storing portion 315 of the cartridge 9 mounted to the image forming apparatus 100 and the apparatus identification information stored in the apparatus identification information storing portion coincide with each other, and can discriminate that the cartridge 9 is exchanged in the case where these pieces of information and are different from each other.

Further, the order of access to the cartridges 9 is not limited to the above-described order in this embodiment. In the case where switching of the electric storing device 6 which is an access object takes more time, it is desirable to access the cartridges 9 in the order in which it takes least time. For example, when the image forming condition reading is made in the order of the electric storing devices 6*a*, 6*b*, 6*c*, and 6*d*, the cartridge authentication is started from the electric storing device 6*d*. By this, it is possible to reduce the number of times of switching of the electric storing device 6. Thus, the image forming apparatus 100 may be an image forming apparatus to which the plurality of cartridges 9 are mounted and which is capable of communicating with only one device 6 at the same time. Further, in this case, the authentication portion 220 is capable of starting the authentication processing from the cartridge 9, of the plurality of the cartridges 9, with which the acquiring portion 221 last communicates.

Embodiment 3

Next, another embodiment of the present invention will be described. Basic constitution and operation of an image forming apparatus of an embodiment 3 are the same as those of the image forming apparatus of the embodiment 1. Accordingly, in the image forming apparatus of the embodiment 3, as regards elements having the same or corresponding functions and constitutions as those in the image forming apparatus of the embodiment 1, reference numerals or symbols which are the same as those in the embodiment 1 are added and detailed description thereof will be omitted.

In the embodiments 1 and 2, irrespective of the verifying result of the image forming condition, the cartridge authentication is necessarily executed. In this embodiment, the case where execution or non-execution of the cartridge authentication is discriminated depending on the verifying result of the image forming condition will be described. When the time required for the cartridge authentication becomes long, there is a possibility that the time required for the cartridge authentication becomes longer than the time required for the initial check image formation control. For that reason, the time required for the initial check can be shortened by discriminating the execution or non-execution of the cartridge authentication on the basis of the verifying result of the image forming condition.

FIG. 14 is a block diagram showing a system constitution of an image forming apparatus of this embodiment. In this embodiment, the engine controller 201 includes, as a functional block, a cartridge authentication execution discriminating portion 1400 as a cartridge authentication execution discriminating means. This portion is realized by execution of a program, stored in the ROM, by the CPU of the engine controller 201. The cartridge authentication execution discriminating portion 1400 discriminates whether or not the cartridge authentication is executed, on the basis of a verifying result of the image forming condition verifying portion 222. The initial check controller 210 does not execute the cartridge authentication to the cartridge 9 for which the image forming condition verifying portion 222 fails in verification of the image forming condition. Other points of the system constitution shown in FIG. 14 are the same as those described with reference to FIG. 9.

FIG. 15 is a timing chart of the initial check in this embodiment. FIG. 15 shows, as an example, the case where the cartridge authentication to the cartridge 9*a* is not executed. In this embodiment, model information 321 possessed by the electric storing device 6*a* of the cartridge 9*a* is different from cartridge model information 242 held in the engine controller 201.

For that reason, the image forming condition verifying portion 222 discriminates that the verification fails, during verification of the image forming condition 320 acquired from the cartridge 9*a*. Accordingly, the cartridge authentication portion 220 does not execute the cartridge authentication to the cartridge 9*a*. Further, FIG. 15 shows, as an example, the case where a time required for authentication of each cartridge 9 is longer than that in the example shown in FIG. 12. Other points are similar to those in the initial check in the embodiment 2 described with reference to FIG. 12, and therefore, will be appropriately omitted from description. Incidentally, similarly as FIG. 12, FIG. 15 shows, as an example, the case where the cartridges 9*a*, 9*b*, and 9*c* are exchanged but the cartridge 9*d* is not exchanged.

When the cartridge door 130 is closed, the image forming apparatus 100 causes the initial check controller 210 to start the initial check. After the initial check is started, the initial check controller 210 causes the cartridge exchange discriminating portion 900 to execute the cartridge exchange discrimination (T1201). After the cartridge exchange discrimination is executed, the image forming condition reading portion 221 reads the image forming condition 320 from the electric storing device 6*a* of the cartridge 9*a*. The image forming condition verifying portion 222 verifies the read image forming condition 320, and discriminates that the verification fails.

After the image forming conditions are determined for all the cartridges 9*a*, 9*b*, 9*c*, and 9*d* (T1501), the initial check controller 210 executes the cartridge authentication by the cartridge authentication portion 220 in parallel to the initial check image formation control 500. The initial check controller 210 executes authentication of the cartridges 9*b*, 9*c*, and 9*d* because the verification of the image forming condition of the cartridge 9*a* fails (T1501 to T1503). Thereafter, the initial check controller 210 completes processing of the initial check image formation control 500 (T1504). Thereafter, when the cartridge authentication to the cartridge 9*d* is completed (T1505), the initial check controller 210 completes the initial check.

FIG. 16 is a flowchart of the initial check in this embodiment. In FIG. 16, processes similar to those in FIGS. 8 and 13 will be appropriately omitted from description by adding the same step numbers as those in FIGS. 8 and 13. In the flowchart of FIG. 16, processes of discrimination as to whether or not the cartridge is the cartridge 9 which is an authentication object (S1601), discrimination as to whether or not all the cartridges 9 are selected (S1602), and notification of the image forming condition reading result and the authentication result (S1603) are different from those in the flowchart of FIG. 13. Incidentally, in this embodiment, similarly as in the case of FIG. 15, the case where the verification of the image forming condition of the cartridge 9*a* fails will be described as an example. For that reason, the initial check controller 210 selects the basic image forming condition 223 as the image forming condition for the cartridge 9*a*.

In the following, the cartridge authentication in this embodiment will be described. First, the initial check controller 210 selects the cartridge 9 when the cartridge authentication is executed (S1306). Next, the initial check controller 210 discriminates whether or not the cartridge is the cartridge 9 which is an authentication object (cartridge-to-be-authenticated) (S1601). At this time, the cartridge authentication execution discriminating portion 1400 checks whether or not the selected cartridge 9 uses the basic image forming condition 223. In the case where the image forming condition of the selected cartridge 9 is the basic image forming condition 223, the cartridge authentication execution discriminating portion 1400 discriminates that the selected cartridge authentication 9 is not the cartridge 9 which is the authentication object. Next, the initial check controller 210 discriminates whether or not all the cartridges 9*a*, 9*b*, 9*c*, and 9*d* are selected (S1602). On the other hand, in the case where the image forming condition of the selected cartridge 9 is not the basic image forming condition 223, the cartridge authentication execution discriminating portion 1400 discriminates that the selected cartridge 9 is the cartridge 9 which is the authentication object and the executes the cartridge authentication (S1307). In this embodiment, the cartridge 9*a* uses the basic image forming condition 223, and therefore, the cartridge authentication is not executed. On the other hand, for the cartridges 9*b*, 9*c*, and 9*d*, the cartridge authentication is executed. When the authentication is completed until the cartridge 9*d* (S1602), the initial check controller 210 notifies the user of the image forming condition reading result and the authentication result (S1603). At this time, in this embodiment, the authentication is not executed for the cartridge 9*a*, and therefore, the image forming condition reading result is notified to the user. By this, the user can check whether or not the cartridge 9 as assumed is mounted to the image forming apparatus 100. In the later steps are similar to those in FIG. 12.

Thus, in this embodiment, to the image forming apparatus 100, the plurality of cartridges 9 are mounted, and the image forming apparatus 100 includes the authentication execution discriminating portion (cartridge authentication execution discriminating portion) 1400 for discriminating whether or not the authentication processing by the authentication portion 220 is executed. At least a part of the image formation control by the controller 210 and at least a part of the authentication processing by the authentication portion 220 for the cartridge 9 to which the authentication processing by the authentication execution discriminating portion 1400 is executed are executed in parallel. In this embodiment, the authentication execution discriminating portion 1400 discriminates that the authentication processing is not executed for the cartridge 9 discriminated by the verifying portion 222 that the first condition information is unusable.

As described above, in this embodiment, the image forming apparatus 100 discriminates whether or not the cartridge authentication is executed during the initial check, and the cartridge authentication is not executed for the cartridge 9 using the basic image forming condition information 223. Thus, by discriminating the execution or non-execution of the cartridge authentication depending on the image forming condition verification result, the time required for the initial check can be shortened in some cases.

Incidentally, in this embodiment, in the case where the basic image forming condition is used, the cartridge authentication was not executed, but the present invention is not limited thereto. Any processing is applicable when the processing is processing in which the authentication or non-authentication of the cartridge is discriminated depending on the verification result of the image forming condition read from the cartridge 9.

Other Embodiments

In the above, the present invention was described based on specific embodiments, but the present invention is not limited to the above-described embodiments.

In the above-described embodiments, the image forming apparatus was the color image forming apparatus provided with the plurality of stations, but the present invention is not limited thereto. The image forming apparatus may also be a monochromatic image forming apparatus.

Further, in the above-described embodiments, the cartridge was detachably mountable to the apparatus main assembly of the image forming apparatus in a manner such that the photosensitive member and, as process means actable on the photosensitive member, the charging means, the developing means, and the cleaning means are integrally detachably mountable to the apparatus main assembly, but the present invention is not limited thereto. The cartridge may also be a cartridge in which each of the developer container, the developing device, and the like is singly detachably mountable to the apparatus main assembly of the image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-199523 filed on Nov. 26, 2023, which is hereby incorporated by reference herein in its entirety.

What is claimed is:

1. An image forming apparatus to which a cartridge provided with a device including a memory is detachably mountable and in which an image is formed by using the cartridge mounted, the image forming apparatus comprising:

a controller configured to execute image formation control for putting the image forming apparatus in a state in which the image forming apparatus is capable of forming the image based on image information;

an acquiring portion configured to acquire first condition information which is image forming condition information including an operation setting of at least one of a charging unit, an exposure unit, a developing unit, a transfer unit, and a fixing unit from the memory in communication with the device;

a verifying portion configured to verify the first condition information acquired from the memory;

a second condition information storing portion in which second condition information which is image forming condition information including a corresponding operation setting is stored; and an authenticating portion configured to execute authentication processing for authenticating the cartridge in communication with the device, wherein the controller executes at least a part of the image formation control, using the first condition information or the second condition information selected on the basis of a verification result by the verifying portion, in parallel to the authentication processing by the authenticating portion, wherein execution of at least part of the image formation control is started after the first condition information is acquired and verified and before completion of the authentication processing such that at least a part of a period of the image formation control overlaps with at least a part of a period of the authentication processing.

2. An image forming apparatus according to claim 1, wherein the controller executes the image formation control by using the first condition information in a case where the first condition information is discriminated as being usable by the verifying portion, and executes the image formation control by using the second condition information in a case where the first condition information is discriminated as being unusable by the verifying portion.

3. An image forming apparatus according to claim 2, further comprising a model information storing portion in which model information is stored, wherein the verifying portion discriminates that the first condition information is usable in a case where model information acquired from the memory and the model information stored in the model information storing portion coincide with each other, and discriminates that the first condition information is unusable in a case where the model information acquired from the model information stored in the model information storing portion do not coincide with each other.

4. An image forming apparatus according to claim 1, further comprising an exchange discriminating portion configured to discriminate whether or not the cartridge is exchanged, wherein in a case where the first condition information is acquired before present discrimination by the exchange discriminating portion and the cartridge is discriminated as being not exchanged by the present discrimination by the exchange discriminating portion, at least a part of the image formation control by the controller in which the first condition information acquired from the memory before the present discrimination by the exchange discriminating portion and at least a part of the authentication processing by the authenticating portion are executed in parallel to each other.

5. An image forming apparatus according to claim 4, further comprising a discrimination information storing portion configured to store cartridge discrimination information, for discriminating the cartridge, acquired from the memory, wherein the exchange discriminating portion discriminates that the cartridge is not exchanged in a case where the cartridge discrimination information acquired from the memory of the cartridge mounted to the image forming apparatus and the cartridge discrimination information stored in the discrimination information storing portion coincide with each other, and discriminates that the cartridge is exchanged in a case where the cartridge discrimination information acquired from the memory and the cartridge discrimination information stored in the discrimination information storing portion are different from each other.

6. An image forming apparatus according to claim 4, further comprising:

an apparatus discrimination information storing portion in which apparatus discrimination information for discriminating the image forming apparatus is stored; and a writing portion configured to cause the memory, of the cartridge mounted to the image forming apparatus, to store the apparatus discrimination information, wherein the exchange discriminating portion discriminates that the cartridge is not exchanged in a case where the apparatus discrimination information acquired from the memory of the cartridge mounted to the image forming apparatus and the apparatus discrimination information stored in the apparatus discrimination information storing portion coincide with each other, and discriminates that the cartridge is exchanged in a case where the apparatus discrimination information acquired from the memory and the apparatus discrimination information stored in the apparatus discrimination information storing portion are different from each other.

7. An image forming apparatus according to claim 4, further comprising:

a discrimination information storing portion configured to store cartridge discrimination information, for discriminating the cartridge, acquired from the memory;

an apparatus discrimination information storing portion in which apparatus discrimination information for discriminating the image forming apparatus is stored; and a writing portion configured to cause the memory, of the cartridge mounted to the image forming apparatus, to store the apparatus discrimination information, wherein the exchange discriminating portion discriminates that the cartridge is not exchanged in a case where the cartridge discrimination information acquired from the memory of the cartridge mounted to the image forming apparatus and the cartridge discrimination information stored in the discrimination information storing portion coincide with each other, or in a case where the apparatus discrimination information acquired from the memory of the cartridge and the apparatus discrimination information stored in the apparatus discrimination information storing portion coincide with each other, and that the cartridge is exchanged in a case where the cartridge discrimination information acquired from the memory of the cartridge and the cartridge discrimination information stored in the discrimination information storing portion are different from each other, or in a case where the apparatus discrimination information acquired from the memory and the apparatus discrimination information stored in the apparatus discrimination information storing portion are different from each other.

8. An image forming apparatus according to claim 1, wherein the image formation control is control for putting the image forming apparatus in a state in which the image forming apparatus is capable of forming the image on the basis of image information.

* * * * *